US009204261B2

(12) United States Patent
Mukaiyama

(10) Patent No.: US 9,204,261 B2
(45) Date of Patent: Dec. 1, 2015

(54) VEHICULAR CONTROL APPARATUS

(75) Inventor: Yoshio Mukaiyama, Mishima (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 396 days.

(21) Appl. No.: 13/386,350

(22) PCT Filed: Apr. 19, 2010

(86) PCT No.: PCT/JP2010/056947
§ 371 (c)(1), (2), (4) Date: Jan. 20, 2012

(87) PCT Pub. No.: WO2011/132254
PCT Pub. Date: Oct. 27, 2011

(65) Prior Publication Data

US 2012/0123640 A1 May 17, 2012

(51) Int. Cl.

| | |
|---|---|
| ***H04W 4/04*** | (2009.01) |
| ***G08G 1/015*** | (2006.01) |
| ***G08G 1/04*** | (2006.01) |
| ***G08G 1/052*** | (2006.01) |
| ***G08G 1/056*** | (2006.01) |

(Continued)

(52) U.S. Cl.
CPC ............... *H04W 4/046* (2013.01); *G08G 1/015* (2013.01); *G08G 1/04* (2013.01); *G08G 1/052* (2013.01); *G08G 1/056* (2013.01); *G08G 1/096716* (2013.01); *G08G 1/096741* (2013.01); *G08G 1/096783* (2013.01); *G08G 1/164* (2013.01); *G08G 1/166* (2013.01)

(58) Field of Classification Search
CPC ..... G08G 1/0116; G08G 1/093; G08G 1/164; G08G 1/04; G08G 1/096783; G08G 1/096716; G08G 1/056; G08G 1/052; G08G 1/096741; G08G 1/015; G08G 1/166; H04W 4/046
USPC .......................................................... 701/437
See application file for complete search history.

(56) References Cited

U.S. PATENT DOCUMENTS

| | | | | |
|---|---|---|---|---|
| 6,512,464 | B2 * | 1/2003 | Takahashi et al. | 340/905 |
| 7,010,567 | B1 | 3/2006 | Mori | |
| 8,199,028 | B2 * | 6/2012 | Mudalige | 340/905 |

(Continued)

FOREIGN PATENT DOCUMENTS

| | | |
|---|---|---|
| JP | 11-281381 A | 10/1999 |
| JP | 2001-134776 A | 5/2001 |

(Continued)

*Primary Examiner* — John Q Nguyen
*Assistant Examiner* — Michael Whalen
(74) *Attorney, Agent, or Firm* — Sughrue Mion, PLLC

(57) ABSTRACT

A vehicular control apparatus (1) is provided with: an obtaining device (3) capable of receiving an electric wave from an electric wave communication base (E10, E20, N10 etc.) which emits the electric wave for providing driving assistance service to a plurality of vehicles which respectively drive on a plurality of service roads (10A, 10B, 10C, 10D, 20A etc.), and of obtaining a plurality of road data (520A, 520B, 520C, 520D) respectively corresponding to the plurality of service roads managed by the electric wave communication base; and a weighting device (140) for applying, to each of the obtained plurality of road data, weighting information indicating importance for specifying one service road that one vehicle enters and indicating importance for providing the driving assistance services in association with the one service road.

16 Claims, 21 Drawing Sheets

(a)

(b)

| | Route entry to service route | Electric wave receivability | DB holding |
|---|---|---|---|
| (i) | 1 | 1 | 1 |
| (ii) | 1 | 0 | 1 |
| (iii) | 0 | 1 | 1 |
| (iv) | 0 | 0 | 0 |

(51) Int. Cl.

*G08G 1/0967* (2006.01)
*G08G 1/16* (2006.01)

(56) References Cited

U.S. PATENT DOCUMENTS

| | | | | |
|---|---|---|---|---|
| 8,330,621 | B2 * | 12/2012 | Hayashi | 340/905 |
| 8,504,270 | B2 * | 8/2013 | Busch | 701/70 |
| 2002/0036571 | A1 * | 3/2002 | Takahashi et al. | 340/901 |
| 2007/0076652 | A1 | 4/2007 | Nishiwaki | |
| 2010/0033347 | A1 | 2/2010 | Hayashi | |
| 2011/0012755 | A1 * | 1/2011 | Mudalige | 340/905 |
| 2011/0279251 | A1 * | 11/2011 | Yamada | 340/425.5 |
| 2012/0209487 | A1 * | 8/2012 | Busch | 701/70 |

FOREIGN PATENT DOCUMENTS

| | | | |
|---|---|---|---|
| JP | 2002-092793 | A | 3/2002 |
| JP | 2006-301819 | A | 11/2006 |
| JP | 2007-102406 | A | 4/2007 |
| JP | 2009-145212 | A | 7/2009 |
| JP | 2009-251251 | A | 10/2009 |
| WO | WO 2011132254 | A1 * | 10/2011 |

* cited by examiner

FIG. 12

(a)

| Descending order of importance | Route entry judgment |
| --- | --- |
| 1 | Road linear data 520A |
| 2 | Road linear data 520B |
| 3 | Road linear data 520C |
| 4 | Road linear data 520D |
| 5 | Service integrated information 502 |

(b)

| Descending order of importance | Route deviation judgment |
| --- | --- |
| 1 | Road linear data 520A |
| 2 | Service information 503A |
| 3 | Road linear data 520B |
| 4 | Road linear data 520C |
| 5 | Road linear data 520D |

(a)

(b)

(a)

(b)

| | Route entry to service route | Electric wave receivability | DB holding |
|---|---|---|---|
| (i) | 1 | 1 | 1 |
| (ii) | 1 | 0 | 1 |
| (iii) | 0 | 1 | 1 |
| (iv) | 0 | 0 | 0 |

(a)

VEHICULAR CONTROL APPARATUS

CROSS REFERENCE TO RELATED APPLICATIONS

This application is a National Stage of International Application No. PCT/JP2010/056947 filed Apr. 19, 2010, the contents of all of which are incorporated herein by reference in their entirety.

TECHNICAL FIELD

The present invention relates to, for example, a vehicular control apparatus which performs information processing on communication data for performing a driving assistance for a vehicle.

BACKGROUND ART

Recently, an infrastructure cooperative system using electric wave communication has been under development in which a plurality of routing information is transmitted at intersections. Specifically, frequencies for an ITS (Intelligent Transport System) are already determined to be assigned after 2011 in which analog television broadcasting is stopped, and the development is being advanced at a rapid pace toward practical use of the infrastructure cooperative system using the electric wave communication. More specifically, in the infrastructure cooperative system using the electric wave communication, in order to improve a prevalence and merchantability, it is claimed to add services of higher value, such as an ecology function and a vehicle control, in accordance with today's environmentally conscious circumstance. In the configuration on the infrastructure side of the infrastructure cooperative system using the electric wave communication, it is expected to cover the surroundings of intersections and provide services. Even in its communication format, the amount of communication data is predicted to be dramatically larger than that of a conventional type. Moreover, since dynamic information, moving images, and video, an efficient signal processing method is required. In addition, since the configuration on the infrastructure side is different from the conventional type, many new information processing logics are needed on a vehicle side, such as an addition of individual information processing logics, such as route entry judgment, communication situation monitoring, and dynamic information regular analysis, and an adaptation to new service-in or service-out conditions. Thus, it is socially demanded to establish the information processing logics capable of efficiently managing and operating them together with the aforementioned signal processing method.

Moreover, as this type of information processing apparatus, for example, a patent document 1 or the like discloses a technology about an apparatus for judging the false detection of light shielding by using an optical beacon ID held by an optical beacon.

Moreover, as this type of information processing apparatus, for example, a patent document 2 or the like discloses a technology about an apparatus for determining the position of a vehicle by distinguishing between a high level road and a general road in a situation in which a plurality of roads are close to each other, such as a situation where a elevated highway runs above and parallel to the general road.

BACKGROUND ART DOCUMENTS

Patent Documents

Patent document 1: Japanese Patent Application Laid Open No. 2009-145212

Patent document 2: Japanese Patent Application Laid Open No. Hei 11-281381

DISCLOSURE OF INVENTION

Subject to be Solved by the Invention

However, under the infrastructure cooperative system using the electric wave communication, the data communicated between the vehicles and road-side infrastructure is enormous. This causes such a technical problem that an operation load increases when the information processing is performed on the communicated data.

In view of the aforementioned problem, it is therefore an object of the present invention to provide, for example, a vehicular control apparatus capable of performing the information processing on the data obtained by the electric wave communication, more efficiently.

Means for Solving the Subject

The above object of the present invention can be achieved by a first vehicular control apparatus provided with an obtaining device capable of receiving an electric wave from an electric wave communication base which emits the electric wave for providing driving assistance service to a plurality of vehicles which respectively drive on a plurality of service roads, and of obtaining a plurality of road data respectively corresponding to the plurality of service roads managed by the electric wave communication base; and a weighting device for assigning, to each of the obtained plurality of road data, weighting information indicating importance for specifying one service road that one vehicle enters and indicating importance for providing the driving assistance service in association with the one service road.

Here, the driving assistance service means service capable of assisting driver of vehicle with his driving, such as a red light overlooking prevention service. Typically, the following driving assistance services can be listed: the red light overlooking prevention service for making the driver of the vehicle perceive red light, a traffic light passing assistance service for providing smooth passing at intersection, a service for preventing collision in turning right, a service for preventing collision with pedestrian, a service for preventing the overlooking of stop regulation, and the like.

The service road of the present invention means a road on which the driving assistance service can be provided to one vehicle which drives on the service road by that the one vehicle receives the electric wave emitted from the electric wave communication base. Typically, the service road means a road whose unit is a lane if the driving assistance service is performed in units of lanes. Moreover, the term of enter or entry in the present invention means that the vehicle physically goes into and drives on the service road. The entry to the service road may be an entry in the direction toward which the service road extends, or a crosswise entry to the service road from the middle of the service road.

According to the first vehicular control apparatus of the present invention, by means of the obtaining device which can be composed of a communication apparatus provided with a memory, a processor and the like, the electric wave is received from the electric wave communication base which emits the electric wave for providing the driving assistance service to the plurality of vehicles which respectively drive on the plurality of service roads, and the plurality of road data respectively corresponding to the plurality of service roads managed by the electric wave communication base are obtained.

Here, the road data of the present invention means information about the service road and information about the driving assistance service provided on the service road. Typically, the road data means road linear data capable of defining the road shape of the service road, traffic light cycle information as service information for providing the driving assistance service on the service road, traffic congestion information as the service information, obstacle detection information as the service information, and the like.

By means of the weighting device which can include a memory, a processor and the like, the weighting information indicating the importance for specifying one service road that one vehicle enters is assigned to each of the obtained plurality of road data. Here, the term "specify" in the present invention typically means to directly or indirectly "specify", "select", "detect" or perform similar actions on one service road that one vehicle, such as a self-vehicle, actually enters. Moreover, it may include to directly or indirectly "specify", "select", "detect" or perform similar actions on one service road that one vehicle likely enters. Typically, one service road that one vehicle enters is specified on the basis of the obtained plurality of road data alone, or on the basis of position data about the position of the one vehicle measured, for example, by a Global Positioning System (GPS) in addition to the obtained plurality of road data.

The "importance for specifying one service road that one vehicle enters" in the present invention not only means whether or not information is essential to specify one service road that one vehicle enters, but also means the extent of the necessity for specifying the one service road. Typically, the road linear data about the road shape of the service road may be set to have high importance for specifying the one service road, and data about the driving assistance service provided on another service road that the one vehicle does not enter may be set to have low importance.

Moreover, the "importance for providing the driving assistance service in association with the one service road" not only means whether or not information is essential to provide the driving assistance service in association with one service road that one vehicle enters, but also means the extent of the necessity for providing the driving assistance service in association with one service road that one vehicle enters. Typically, it may mean the importance for providing the driving assistance service on the one service road, or may mean the importance for providing the driving assistance service on another service road that the vehicle likely enters after passing through the one service road.

By means of the weighting device which can include a memory, a processor and the like, the weighting information indicating the importance for specifying one service road that one vehicle enters and indicating the importance for providing the driving assistance service in association with the one service road is assigned to each of the obtained plurality of road data.

This makes it possible to select more important information from the plurality of road data on the basis of the weighting information assigned to each of the plurality of road data. Thus, it is possible to effectively prevent the expansion of the information amount of the plurality of road data. This makes it possible to effectively reduce the operation load when the information processing is performed on the plurality of road data, and thus it is extremely useful in practice.

If the weighting information described above is not assigned to the plurality of road data, the obtained plurality of road data need to be stored without change, resulting in the expansion of the information amount of the plurality of road data. This causes such a technical problem that the operation load increases when the information processing is performed on the plurality of road data.

In one aspect of the vehicular control apparatus of the present invention, it is further provided with a first specifying device for specifying one service road that one vehicle enters.

According to this aspect, one service road that one vehicle, such as a self-vehicle, enters is specified by the specifying device which can include a memory, a processor and the like. The specifying device typically specifies one service road that one vehicle enters, on the basis of the obtained plurality of road data alone, or on the basis of the position data about the position of the one vehicle measured, for example, by the GPS in addition to the obtained plurality of road data.

By this, on the basis of whether or not one service road that one vehicle enters is specified, it is possible to select which importance is prioritized between the importance for specifying the one service road described above and the importance for providing the driving assistance service in association with the one service road. This makes it possible to select more important information from the plurality of road data.

In another aspect of the vehicular control apparatus of the present invention, it is provided with a deleting device for deleting one portion of the obtained plurality of road data on the basis of the assigned weighting information.

According to this aspect, it is possible to delete one portion of the plurality of road data which is less important out of the plurality of road data, on the basis of the weighting information assigned to each of the plurality of road data. Thus, it is possible to effectively prevent the expansion of the information amount of the plurality of road data. This makes it possible to effectively reduce the operation load when the information processing is performed on the plurality of road data, and thus it is extremely useful in practice.

The above object of the present invention can be also achieved by a second vehicular control apparatus provided with: an obtaining device capable of receiving an electric wave from an electric wave communication base which emits the electric wave for providing driving assistance service to a plurality of vehicles which respectively drive on a plurality of service roads, and of obtaining a plurality of road data respectively corresponding to the plurality of service roads managed by the electric wave communication base; a memory device for storing the obtained plurality of road data; and a weighting device for assigning, to each of the stored plurality of road data, weighting information indicating importance for specifying one service road that one vehicle enters and indicating importance for providing the driving assistance service in association with the one service road.

According to the second vehicular control apparatus of the present invention, it is provided with the obtaining device of the first control apparatus described above.

The obtained plurality of road data is stored, for example, in a database format, by the memory device such as a memory.

By means of the weighting device which can include a memory, a processor and the like, the weighting information indicating the importance for specifying one service road that one vehicle enters and indicating the importance for providing the driving assistance service in association with the one service road is assigned to each of the obtained plurality of road data.

This makes it possible to select more important information from the plurality of road data stored in the memory device, on the basis of the weighting information assigned to each of the plurality of road data. Thus, it is possible to effectively prevent the expansion of the information amount of the stored plurality of road data. This makes it possible to effectively reduce the operation load when the information processing is performed on the plurality of road data stored in the memory device, and thus it is extremely useful in practice.

In another aspect of the vehicular control apparatus of the present invention, it is further provided with a memory controlling device for controlling the memory device to delete one portion of the stored plurality of road data on the basis of the assigned weighting information.

According to this aspect, it is possible to delete one portion of the plurality of road data which is less important out of the stored plurality of road data, on the basis of the weighting information assigned to each of the plurality of road data. Thus, it is possible to effectively prevent the expansion of the information amount of the stored plurality of road data. This makes it possible to effectively reduce the operation load when the information processing is performed on the stored plurality of road data, and thus it is extremely useful in practice.

In another aspect of the vehicular control apparatus of the present invention, the obtaining device obtains a plurality of road linear data about road shapes of the plurality of service roads as the plurality of road data, and the vehicular control apparatus is further provided with a second specifying device for specifying one service road that one vehicle enters, on the basis of the obtained plurality of road linear data.

According to this aspect, the information processing can be performed on the road linear data having a smaller information amount in comparison with the road data including the information about the road shape of the service road and the information about the driving assistance service. Thus, it is possible to specify one service road, more efficiently and quickly.

In another aspect of the vehicular control apparatus of the present invention, it is further provided with: a first specifying device capable of specifying one service road that one vehicle enters; a first judging device for judging whether or not the one vehicle deviates from the specified one service road; a second judging device for judging whether or not the electric wave can be received; a memory device for storing the obtained plurality of road data; and a first controlling device for controlling the memory device (i) to hold the stored plurality of road data if it is judged that the one vehicle deviates from the specified one service road and if it is judged that the electric wave can be received and (ii) to delete the stored plurality of road data if it is judged that the one vehicle deviates from the specified one service road and if it is judged that the electric wave cannot be received.

According to this aspect, one service road that one vehicle, such as a self-vehicle, enters is specified by the specifying device which can include a memory, a processor and the like. By means of the first judging device which can include, for example, a memory, a processor and the like, it is judged whether or not the one vehicle deviates from the specified one service road. Typically, the first judging device may judge whether or not the one vehicle deviates from the specified one service road, on the basis of the obtained plurality of road data and the position data about the position of the one vehicle measured, for example, by the GPS. By means of the second judging device which can include, for example, a memory, a processor and the like, it is judged whether or not the electric wave can be received. By means of the memory device such as a memory, the obtained plurality of road data is stored. Under the control of the first controlling device which can include a memory, a processor and the like, the memory device (i) holds the stored plurality of road data if it is judged that the one vehicle deviates from the specified one service road and if it is judged that the electric wave can be received. On the other hand, the memory device (ii) deletes the stored plurality of road data if it is judged that the one vehicle deviates from the specified one service road and if it is judged that the electric wave cannot be received.

By this, it is possible to delete less important information out of the plurality of road data stored in the memory device, on the basis of whether or not one service road is specified, whether or not the vehicle deviates from the one service road, or whether or not the electric wave can be received. Thus, it is possible to effectively prevent the expansion of the information amount of the stored plurality of road data. This makes it possible to effectively reduce the operation load when the information processing is performed on the plurality of road data stored in the memory device, and thus it is extremely useful in practice.

The above object of the present invention can be also achieved by a third vehicular control apparatus provided with: an obtaining device capable of receiving a first electric wave from a first communication base which emits the first electric wave for providing driving assistance service to a plurality of vehicles which respectively drive on a plurality of first service roads, and of obtaining a plurality of first road data respectively corresponding to the plurality of first service roads managed by the first communication base and capable of receiving a second electric wave from a second communication base which is different from the first communication base, and of obtaining a plurality of second road data respectively corresponding to a plurality of second service roads managed by the second communication base; and a weighting device for assigning, to each of the obtained plurality of first road data and the obtained plurality of second road data, weighting information indicating importance for specifying one first service road or one second service road that one vehicle enters and indicating importance for providing the driving assistance service in association with the one first service road or the one second service road.

According to the third vehicular control apparatus of the present invention, the obtaining device which can be composed of a communication apparatus provided with a memory, a processor and the like can receive the first electric wave from the first communication base, which is the electric wave communication base associated with the first and second vehicular control apparatuses described above, and obtains the plurality of first road data respectively corresponding to the plurality of first service roads managed by the first communication base. At the same time, the obtaining device can receive the second electric wave from the second communication base which is different from the first communication base, and obtains the plurality of second road data respectively corresponding to the plurality of second service roads managed by the second communication base.

By means of the weighting device, the weighting information indicating the importance for specifying one first service road or one second service road that one vehicle enters and indicating the importance for providing the driving assistance service in association with the one first service road or the one second service road is assigned to each of the obtained plurality of first road data and the obtained plurality of second road data.

This makes it possible to select more important information from the plurality of first road data and the plurality of second road data, on the basis of the weighting information assigned to each of the plurality of first road data and the plurality of second road data. Thus, it is possible to effectively prevent the expansion of the information amount of the plurality of first road data and the plurality of second road data. This makes it possible to effectively reduce the operation load when the information processing is performed on the plurality of first road data and the plurality of second road data, and thus it is extremely useful in practice.

In one aspect of the vehicular control apparatus of the present invention, it is further provided with a deleting device for deleting one portion of the obtained plurality of first road data and the obtained plurality of second road data on the basis of the assigned weighting information.

According to this aspect, it is possible to delete one portion of the data which is less important out of the plurality of first road data and the plurality of second road data, on the basis of the weighting information assigned to each of the plurality of first road data and the plurality of second road data. Thus, it is possible to effectively prevent the expansion of the information amount of the plurality of first road data and the plurality of second road data. This makes it possible to effectively reduce the operation load when the information processing is performed on the plurality of first road data and the plurality of second road data, and thus it is extremely useful in practice.

In another aspect of the vehicular control apparatus of the present invention, it is further provided with a third specifying device for specifying one first service road or one second service road that one vehicle enters.

According to this aspect, one first service road or one second service road that one vehicle, such as a self-vehicle, enters is specified by the third specifying device which can include a memory, a processor and the like.

By this, on the basis of whether or not one first service road that one vehicle enters is specified or whether or not one second service road that one vehicle enters is specified, it is possible to select which importance is prioritized between the importance for specifying the one first service road or the one second service road that the one vehicle enters as described above and the importance for providing the driving assistance service in association with the one first service road or the one second service road. This makes it possible to select more important information from the plurality of first road data and the plurality of second road data.

In another aspect of the vehicular control apparatus of the present invention, it is further provided with; a memory device for storing the obtained plurality of first road data and the obtained plurality of second road data; and a second controlling device for controlling the memory device to delete one portion of the stored plurality of first road data and the stored plurality of second road data on the basis of (i) whether or not one first service road or one second service road that one vehicle enters is specified, (ii) condition of reception of the first electric wave, (iii) condition of reception of the second electric wave, or (iv) whether or not the one vehicle deviates from the specified one first service road or the specified one second service road.

According to this aspect, under the control of the second controlling device which can include a memory, a processor and the like, it is possible to delete one portion of the data which is less important out of the plurality of first road data and the plurality of second road data, on the basis of at least one of the aforementioned four conditions (i.e. (i), (ii), (iii), or (iv)). Thus, it is possible to effectively prevent the expansion of the information amount of the plurality of first road data and the plurality of second road data. This makes it possible to effectively reduce the operation load when the information processing is performed on the plurality of first road data and the plurality of second road data, and thus it is extremely useful in practice.

In another aspect of the vehicular control apparatus of the present invention, the second controlling device controls the third specifying device to specify one first service road or one second service road that one vehicle enters, on the basis of the obtained plurality of first road data and the obtained plurality of second road data if the second electric wave is received after the one first service road that the one vehicle enters is specified and if the one vehicle deviates from the specified one service road after the second electric wave is received.

According to this aspect, even if the one vehicle re-enters the first service road, it is possible to specify the first service road that the one vehicle enters, appropriately.

In another aspect of the vehicular control apparatus of the present invention, the second controlling device controls the memory device to delete the stored plurality of first road data if the one vehicle deviates from the specified one first service road.

According to this aspect, if the one vehicle deviates from the specified one first service road, the stored plurality of first road data is deleted under the control of the second controlling device because the stored plurality of first road data is less important. Thus, it is possible to effectively prevent the expansion of the information amount of the plurality of first road data and the plurality of second road data. This makes it possible to effectively reduce the operation load when the information processing is performed on the plurality of first road data and the plurality of second road data, and thus it is extremely useful in practice.

In particular, the plurality of first road data and the plurality of second road data have an enormous information amount in comparison with that of the plurality of first road data. Thus, it is extremely useful in practice to prevent the expansion of the information amount by sorting out the data in accordance with the importance of the data with this enormous information amount.

In another aspect of the vehicular control apparatus of the present invention, the second controlling device controls the memory device to delete the stored plurality of first road data and to hold the stored plurality of second road data if the condition of reception changes from a reception condition in which the first electric wave and the second electric wave can be received to a reception condition in which only the second electric wave can be received without specifying the service road that the one vehicle enters.

According to this aspect, if the condition of reception changes from the reception condition in which the first electric wave and the second electric wave can be received to the reception condition in which only the second electric wave can be received without specifying the service road that the one vehicle enters, the stored plurality of first road data is deleted and the stored plurality of second road data is held under the control of the second controlling device because the one vehicle less likely re-enters the one first service road. Thus, it is possible to effectively prevent the expansion of the information amount of the plurality of first road data and the plurality of second road data. This makes it possible to effectively reduce the operation load when the information processing is performed on the plurality of first road data and the plurality of second road data, and thus it is extremely useful in practice.

In particular, the plurality of first road data and the plurality of second road data have an enormous information amount in comparison with that of the plurality of first road data. Thus, it is extremely useful in practice to prevent the expansion of the information amount by sorting out the data in accordance with the importance of the data with this enormous information amount.

The operation and other advantages of the present invention will become more apparent from embodiments explained below.

BRIEF DESCRIPTION OF DRAWINGS

FIG. 12 are a table showing information which is important in route entry judgment in the first embodiment (FIG. 12(*a*)) and a table showing information which is important in route deviation judgment (FIG. 12(*b*)).

MODE FOR CARRYING OUT THE INVENTION

Hereinafter, preferred embodiments of the present invention will be explained with reference to the drawings.

First Embodiment

Basic Structure

The basic structure of an in-vehicle information processing apparatus in a first embodiment will be explained with reference to FIG. 1 to FIG. 5.

Figure 1:
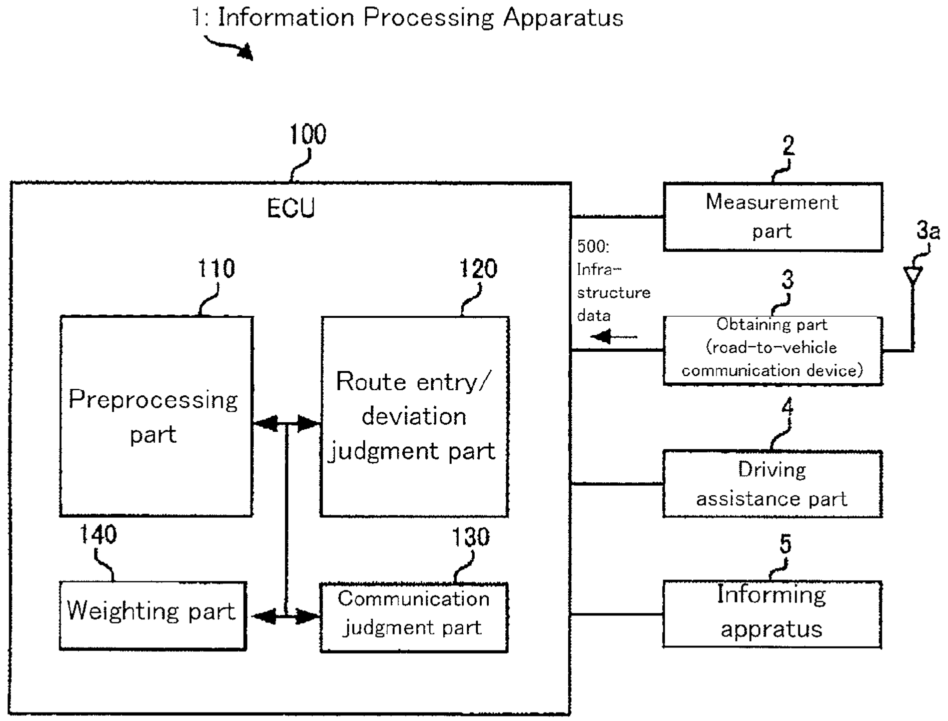
FIG. 1 is a block diagram showing the structure of an in-vehicle information processing apparatus in a first embodiment.
Figure 2:
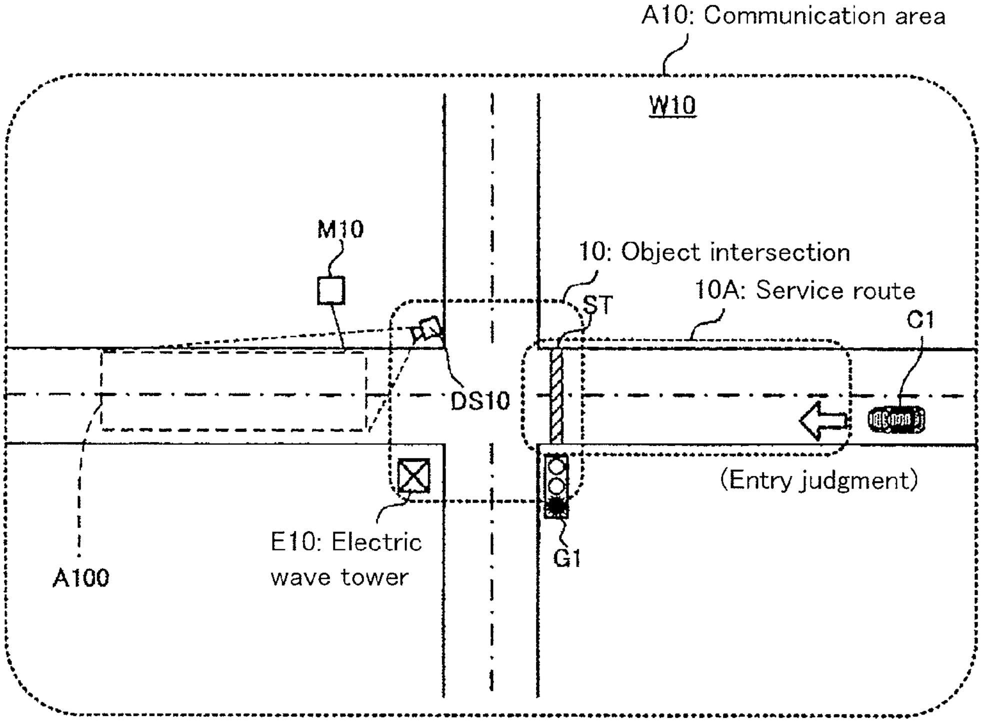
FIG. 2 is a schematic diagram showing a situation in which a self-vehicle with the information processing apparatus in the first embodiment installed enters an intersection.

Firstly, the basic structure of the in-vehicle information processing apparatus in the embodiment will be explained with reference to FIG. 1 and FIG. 2. FIG. 1 is a block diagram showing the structure of the in-vehicle information processing apparatus in the embodiment. FIG. 2 is a schematic diagram showing a situation in which a self-vehicle with the information processing apparatus in the embodiment installed enters an intersection.

(Overall Outline)

In FIG. 1 and FIG. 2, an in-vehicle information processing apparatus 1 in the embodiment (refer to FIG. 1) is an apparatus, installed in a self-vehicle C1 (refer to FIG. 2), for receiving an electric wave W10 emitted from an electric wave tower E10 provided at an object intersection 10 before the self-vehicle C1 driving on a service route 10A enters the object intersection 10 and for performing information processing on data held by the received electric wave W10 in order to provide various traffic services to a driver of the self-vehicle C1. As the various traffic services, the following driving assistance services can be listed: a red light overlooking prevention service for making the driver of the vehicle perceive red light, a traffic light passing assistance service for providing smooth passing at intersection, a service for preventing collision in turning right, a service for preventing collision with pedestrian, a service for preventing the overlooking of stop regulation, and the like. Incidentally, those various traffic services constitute one example of the driving assistance service of the present invention.

(Basic Structure of In-Vehicle Information Processing Apparatus))

In FIG. 1, the in-vehicle information processing apparatus 1 in the embodiment is provided with a measurement part 2, an obtaining part (e.g. road-to-vehicle communication device) 3, a driving assistance part 4, an informing apparatus 5, and an ECU 100. Incidentally, the in-vehicle information processing apparatus constitutes one example of the vehicular control apparatus of the present invention.

The measurement part 2 measures vehicle information about the driving state of the self-vehicle C1, such as a current position, speed and acceleration of the self-vehicle C1. Typically, the measurement part 2 is, for example, a self positioning apparatus or the like, and it is provided with an acceleration sensor, an angular velocity sensor, and a distance sensor. The acceleration sensor is provided, for example, with a piezoelectric element, and it detects the acceleration of the vehicle and outputs acceleration data. The angular sensor is provided, for example, with a vibrating gyroscope, and it detects the angular velocity of the vehicle when the vehicle changes its direction and outputs angular velocity data and relative orientation data. The distance sensor measures a vehicle speed pulse which is composed of pulse signals generated in accordance with the rotation of the wheels of the vehicle. In addition, typically, the measurement part 2 may be provided with an accelerator opening sensor for measuring the accelerator opening degree of the self-vehicle C1.

The obtaining part 3 is typically a road-to-vehicle communication device and a communication device for communicating with road-side infrastructure disposed on a road on which the self-vehicle C1 drives, and it communicates with the road-side infrastructure through a road-to-vehicle communication antenna 3*a*. More specifically, the obtaining part 3 communicates with the electric wave tower E10 (refer to FIG. 2) which is a road-side infrastructure apparatus constituting one portion of the road-side infrastructure. The obtaining part 3 receives, from the electric power tower E10 as the road-side infrastructure apparatus, traffic light cycle information about a traffic light G1 disposed at the object intersection 10 and presence state information indicating the presence state of another vehicle which exists near the object intersection 10. Incidentally, the traffic light cycle information includes the current color of the traffic light, a time length until the current color changes (e.g. a time length until the color changes to red or yellow if the current light is green), and the like. Incidentally, the obtaining part 3 constitutes one example of the obtaining device of the present invention.

The obtaining part 3 may more typically receive various information, for example, about GPS signals, map information, and road traffic information, and it may transmit the various vehicle information such as, for example, information about the position of the self-vehicle C1 to an information management server. More typically, the vehicle information may mean quantitative and qualitative data about the driving operation timing of the driver, the amount of the driving operation, the direction of the driving operation, and the speed or acceleration/deceleration of the vehicle.

More specifically, the obtaining part 3 receives electric waves which carry downstream data including positioning data, from a plurality of GPS satellites in order to receive the GPS signals. The positioning data is used to detect the absolute position of the vehicle from latitude and longitude information or the like. More specifically, the obtaining part 3 may include, for example, a FM tuner, a beacon receiver, a mobile phone, a special communication card or the like, and it may receive the so-called road traffic information, such as traffic congestion and traffic information, and other information which are distributed from a traffic environment information server at a Vehicle Information Communication System (VICS) center or the like through a communication interface, for example, through a communication network such as electric waves. More specifically, the obtaining part 3 may receive information about all or an updated portion of the map information.

The driving assistance part 4 performs driving assistance for realizing an improvement in fuel efficiency and safe driving, on the basis of the traffic light cycle information received by the obtaining part 3. Typically, the driving assistance part 4 actually performs the driving assistance for the self-vehicle C1 so as to realize a set target driving direction of the self-vehicle C1, a target value of a driving speed, or a target value of driving acceleration. Here, the driving assistance in the embodiment means assisting the driving operations of the driver, such as acceleration, deceleration, starting, stopping, or turning of the self-vehicle C1, in an auxiliary manner. Typically, the driving assistance in the embodiment may mean changing the driving direction, driving speed, or driving acceleration of the vehicle to a safe side by a predetermined amount. More typically, the driving assistance part 4 may be configured to implement an electronically-controlled antilock brake system (ABS).

The informing apparatus 5 is specifically a display, a speaker or the like, and it is an informing apparatus for informing the driver of the self-vehicle C1 of various information. The informing apparatus 5 informs, for example, the driver of the self-vehicle C1 of a target speed, an indication of deceleration, an indication that the traffic light will change to red, or similar indications, under control by the ECU 100 described later. In particular, the term "informing" in the embodiment may mean auditory notification of the target speed to the driver by audio, in addition to or instead of visual display of the target speed to the driver through the display. More typically, as for the display of the target speed through the display, the target speed may be displayed by the digital display of the target speed, by the flushing of a mark or graduation indicating the target speed on a speed meter, or by similar means. Alternatively, the term "informing" in the embodiment may typically mean tactile notification, such as an operation of pushing back an accelerator pedal on which the driver steps or an operation through a so-called Human Machine Interface (HMI).

The informing apparatus 5 may be typically provided with a navigation apparatus for route guidance, which enables the driver of the self-vehicle C1 to perceive guide information for guiding the driver to a destination or a meeting place. This navigation apparatus may be provided with a display unit, an audio output unit, a data memory unit, a system controller and the like. This display unit displays various display data on a display apparatus, such as a display, for example, under the control of the system controller for navigation. Specifically, the system controller for navigation reads the map information from the data memory unit. The display unit displays, on a display screen of the display or the like, the map information read from the data memory unit by the system controller for navigation. The display unit may be provided with; a graphic controller for controlling the entire display unit on the basis of control data transmitted from a Central Processing Unit (CPU) through a bus line; a buffer memory 42 which is composed of a memory such as a Video RAM (VRAM) and which temporarily stores immediately displayable image information; a display control part for display-controlling the display, such as a liquid crystal display and a Cathode Ray Tube (CRT) display, on the basis of image data outputted from the graphic controller; and the display. This display is composed of, for example, a liquid crystal display apparatus with a diagonal of about 5 to 10 inches or the like, and it is installed near a front panel inside the vehicle. Moreover, the aforementioned audio output unit may be provided with: a D/A converter 51 for performing D/A conversion of audio digital data transmitted through the bus line from a disk drive, a RAM or the like under the control of the system controller; an amplifier (AMP) for amplifying an audio analog signal outputted from the D/A converter; and a speaker for converting the amplified audio analog signal to audio and outputting it to the inside of the vehicle. Moreover, the aforementioned data memory unit is composed of, for example, a HDD, and it stores therein various data used for a navigation process, such as the map information and facility data. Moreover, the aforementioned system controller includes an interface, a CPU, a ROM, and a RAM, and it may control the entire navigation apparatus and perform various controls capable of realizing the routing guidance, which enables the driver of the self-vehicle C1 to perceive the guide information for guiding the driver to the destination or the meeting place.

The ECU 100 is one example of the "weighting device", the "first specifying device", the "first controlling device", the "second controlling device", the "deleting device", and the "memory controlling device". For example, the ECU 100 is configured as a computer provided with a Central Processing Unit (CPU), a Micro Processing Unit (MPU), an Electronic Controlled Unit (ECU), a Read Only Memory (ROM), a Random Access Memory (RAM) or the like. The ECU 100 is provided with a preprocessing part 110, a route entry/deviation judgment part 120, a communication judgment part 130, and a weighting part 140.

The preprocessing part 110 performs information processing, such as unifying the formats of data structures, as a previous stage of database compilation, on information included in infrastructure data 500 received by the obtaining part 3. Typically, the preprocessing part 110 may be provided with a memory apparatus such as, for example, a hard disk drive (HDD).

The route entry/deviation judgment part 120 judges whether or not the self-vehicle C1 enters a service route and judges whether or not the self-vehicle C1 deviates from a special service route. Typically, the route entry/deviation judgment part 120 may be provided with a memory apparatus such as, for example, a hard disk drive (HDD). Incidentally, the route entry/deviation judgment part 120 constitutes one example of the "first specifying device", the "second specifying device", the "third specifying device", and the "first judging device" of the present invention.

The communication judgment part 130 judges whether or not the self-vehicle C1 receives the electric wave from the electric wave tower. Incidentally, the communication judgment part 130 constitutes one example of the "second judging device" of the present invention.

The weighting part 140 assigns, to the received infrastructure data 500, weighting information indicating importance for specifying the service route 10A that the self-vehicle C1 enters and indicating importance for providing the aforementioned traffic service(s) in association with the service route 10A. Incidentally, the importance will be described later.

The ECU 100 integrally controls the information processing apparatus 1 for performing the information processing on the infrastructure data 500 received by the obtaining part 3. Typically, the ECU 100 may be provided with a memory apparatus such as, for example, a hard disk drive (HDD). The memory apparatus may store therein various databases. The various databases are for storing and accumulating therein the aforementioned vehicle information. Moreover, the various databases can store therein various data such as, for example, the map information and the facility data. In particular, the various databases can store therein the vehicle information with the vehicle information being associated with each of the road shape of the road with traffic lights or the traffic environment information. Here, the traffic environment information in the embodiment means information about traffic environments and the natural environment in which the vehicle drives, such as presence or absence of traffic lights, presence or absence of vehicles ahead or pedestrians, traffic volume, weather, and differentiation between day and night, which can be specified, for example, on the basis of the map information, images taken by an in-vehicle camera, the received road traffic information or the like.

(Structure of Road-Side Infrastructure)

Figure 3:
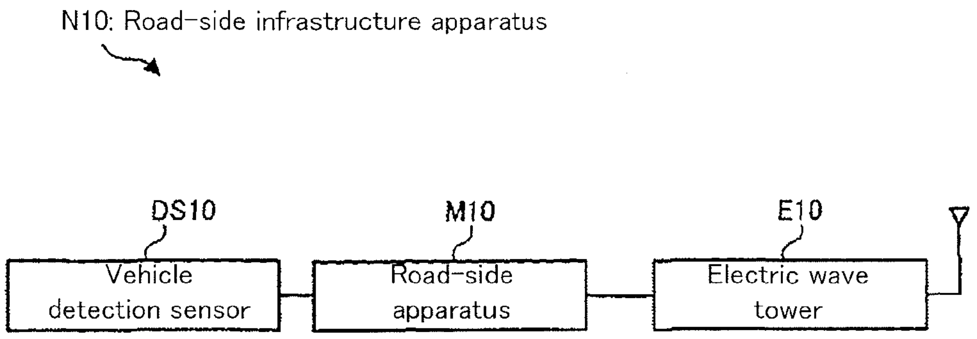
FIG. 3 is a block diagram showing the structure of a roadside infrastructure apparatus N10 in the first embodiment.

Next, the structure of the road-infrastructure in the embodiment will be explained with reference to FIG. 3 in addition to FIG. 2 described above. FIG. 3 is a block diagram showing the structure of a road-side infrastructure apparatus N10 in the embodiment.

In FIG. 2 and FIG. 3, the road-side infrastructure apparatus N10 in the embodiment (refer to FIG. 3) is provided with a vehicle detection sensor DS10, a road-side apparatus M10, and the electric wave tower E10.

The vehicle detection sensor DS10 is specifically a camera sensor or the like disposed at the intersection, and it can detect the presence state of another vehicle which exists in a detection area A100 located before a stop line ST of the road on which the self-vehicle C1 drives (i.e. with respect to the stop line ST, on the opposite side of the moving direction side of the self-vehicle). The vehicle detection sensor DS10 can detect the number of other vehicles, vehicle speeds, vehicle lengths and the like, as the presence state of another vehicle. If there are a plurality of another vehicles in the detection area A100, the vehicle detection sensor DS10 calculates an average speed of the plurality of another vehicles (in other words, the speed of a vehicle group which consists of the plurality of another vehicles), as the presence state of another vehicle. In the example in FIG. 2, for example, the vehicle detection sensor DS10 can detect that another vehicle stops in the detection area A100, in accordance with the fact that the traffic light G10 is red.

The road-side apparatus M10 is an information transmitting apparatus for transmitting the various information including the traffic light cycle information about the traffic light G10 disposed at the intersection and the presence state information indicating the presence state of another vehicle detected by the vehicle sensor DS10, to the road-to-vehicle communication device 3 (refer to FIG. 1) through a road-to-vehicle communication antenna 221.

The electric wave tower E10 is typically an electric wave road-side transmitter, and it is an electric wave information transmitting apparatus which is disposed in units of the object intersection that the self-vehicle C1 enters and which transmits the various information including the traffic light cycle information about the traffic light at the intersection which exists along the driving road, such as, for example, the traffic light G1 at the object intersection 10, to the obtaining part 3 (refer to FIG. 1) through the road-to-vehicle communication antenna.

Incidentally, the road-side infrastructure apparatus N10 provided with the vehicle detection sensor DS10, the road-side apparatus M10, and the electric wave tower E10 may be disposed, for example, at each intersection. In other words, the object intersection 10 may be provided with the vehicle detection sensor DS10, the road-side apparatus M10, and the electric wave tower E10. At the same time, an object intersection 20 different from the object intersection 10 may be provided with a vehicle detection sensor, a road-side apparatus, and an electric wave tower E20, separately from the object intersection 10.

(Detailed Structure of ECU)

Figure 4:
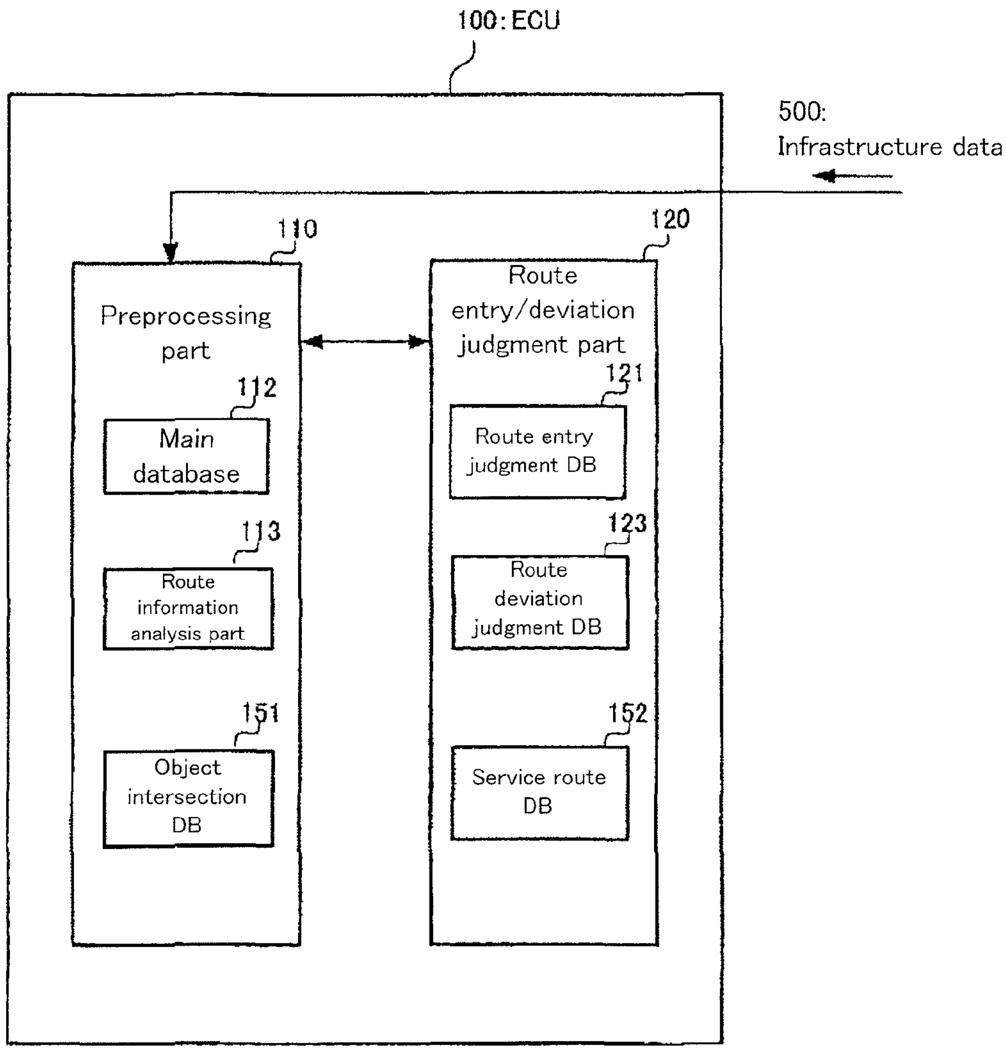
FIG. 4 is a block diagram showing the detailed inner structure of an ECU 100 of the in-vehicle information processing apparatus 1 in the first embodiment.
Figure 5:
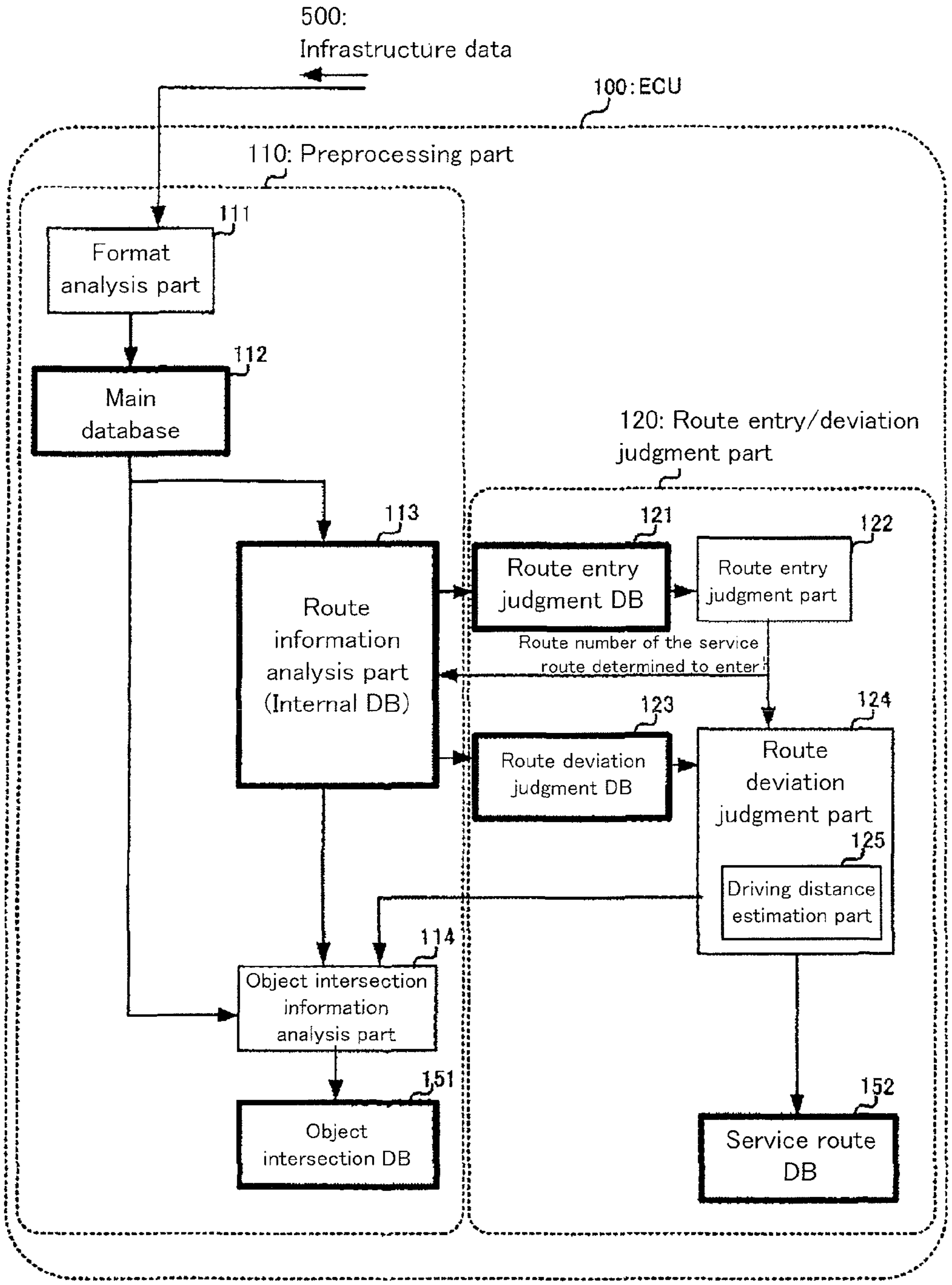
FIG. 5 is a block diagram showing the detailed inner structures of a preprocessing part 110 and a route entry/deviation judgment part 120 of the ECU 100 of the in-vehicle information processing apparatus 1 in the first embodiment.

Now, with reference to FIG. 4 and FIG. 5, the detailed structure of the ECU 100 in the embodiment will be explained. FIG. 4 is a block diagram showing the detailed inner structure of the ECU 100 of the in-vehicle information processing apparatus 1 in the first embodiment. FIG. 5 is a block diagram showing the detailed inner structures of the preprocessing part 110 and the route entry/deviation judgment part 120 of the ECU 100 of the in-vehicle information processing apparatus 1 in the first embodiment.

As shown in FIG. 4, the ECU 100 is provided with; the preprocessing part 110 to which the infrastructure data 500 is inputted from the obtaining part 3; and the route entry/deviation judgment part 120. The preprocessing part 110 is provided with a main database 112, a route information analysis part 113, and an object intersection DB.

The route entry/deviation judgment part 120, which is capable of transmitting the various information to and receiving it from the preprocessing part 110, is provided with a route entry judgment database (hereinafter referred to as a DB as occasion demands), a route deviation judgment DB, and a service route DB.

Specifically, the preprocessing part 110 is provided, as shown in FIG. 5, with a format analysis part 111, the main database 112, the route information analysis part 113, an object intersection information analysis part, and the object intersection DB. A flow of the information related to the inputted infrastructure data 500 will be explained by using FIG. 6 described later.

The route entry/deviation judgment part 120 is provided with the route entry judgment DB 121, a route entry judgment part 122, the route deviation judgment DB 123, a route deviation judgment part 124, and the service route DB 152. The route deviation judgment part 124 includes a driving distance estimation part 125. A flow of the information related to the inputted infrastructure data 500 will be explained by using FIG. 6 described later.

(Operation Principle of In-Vehicle Information Processing Apparatus)

Figure 6:
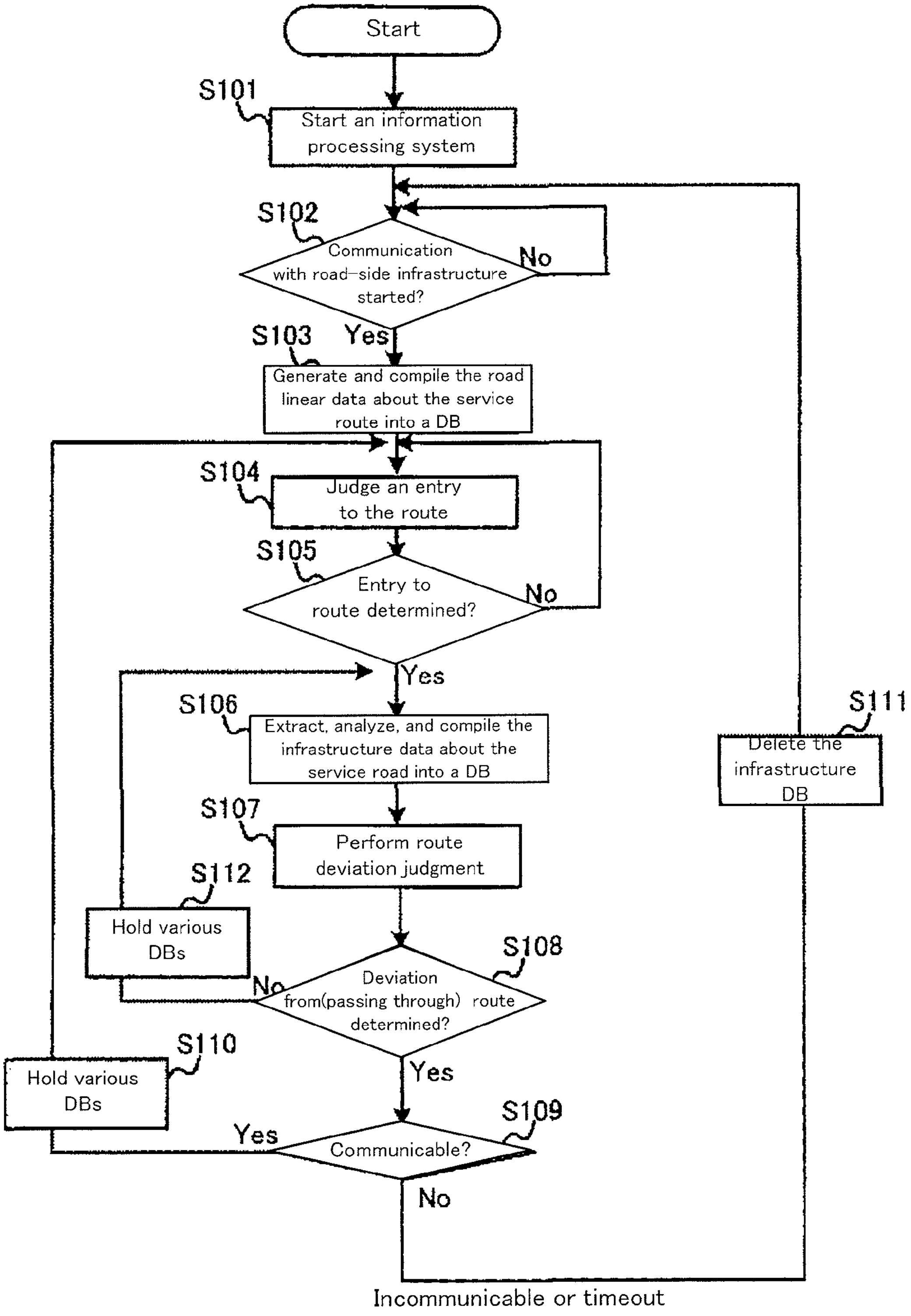
FIG. 6 is a flowchart showing a flow of information processing on the in-vehicle information processing apparatus in the first embodiment.
Figure 7:
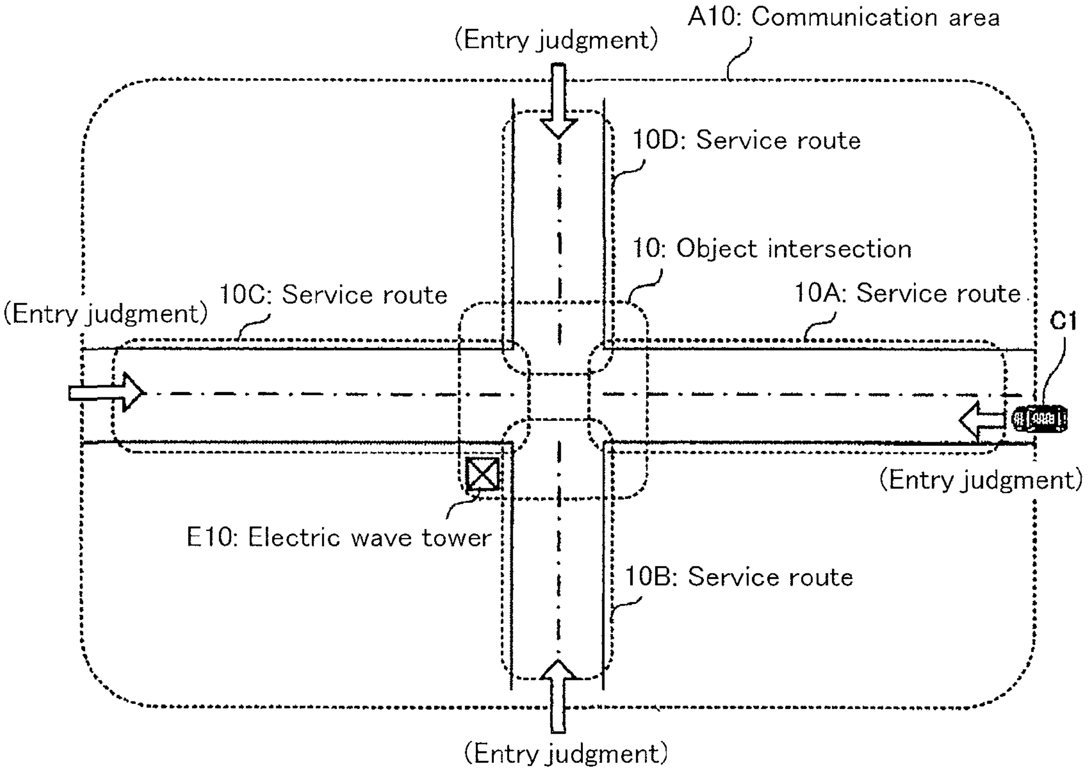
FIG. 7 is a schematic diagram showing a situation in which the self-vehicle with the information processing apparatus in the first embodiment installed enters an intersection at which four service routes intersect one another.

Next, with reference to FIG. 5 described above in addition to FIG. 6 to FIG. 8, the operation principle of the information processing on the in-vehicle information processing apparatus in the first embodiment will be explained including its operation and effects. FIG. 6 is a flowchart showing a flow of the information processing on the in-vehicle information processing apparatus in the first embodiment. FIG. 7 is a schematic diagram showing a situation in which the self-vehicle with the information processing apparatus in the first embodiment installed enters an intersection at which four service routes intersect one another.

Firstly, under the control of the ECU 100, on the in-vehicle information processing apparatus 1, an information processing system which functions cooperatively with the road-side infrastructure is started (step S101).

Then, under the control of the ECU 100, it is judged whether or not the communication between the information processing apparatus 1 and the road-side infrastructure is started (step S102). In particular, at the same time as the start of the communication, the weighting information indicating the most importance for judging the service route that the self-vehicle C1 enters is assigned to the road linear data out of the data included in the infrastructure data by the weighting part 140. Incidentally, a specific example of the weighting information will be described later. By this, the ECU 100 performs the information processing on the road linear data included in the received infrastructure data in preference to service information described later. By this, in comparison with a case where the information processing is performed on all the data included in the infrastructure data, the operation load of the information processing can be reduced. Thus, it is possible to judge the service route that the self-vehicle C1 enters, quickly and appropriately.

As a result of the judgment in the step S102, if it is judged that the communication between the information processing apparatus 1 and the road-side infrastructure is started (the step S102: Yes), under the control of the ECU 100, the road linear data included in the infrastructure data (hereinafter referred to as “road-to-vehicle communication data” as occasion demands) is compiled into a database (hereinafter referred to as a “DB” as occasion demands) (step S103). Typically, road linear data 520A, 520B, 520C, and 520D included in the infrastructure data 500 are obtained through the communication between the information processing apparatus 1 and the road-side infrastructure and are complied into a database. Incidentally, the road linear data 520A, 520B, 520C, and 520D are transmitted and received together with an infrastructure identification number 511 described later. By this, the road-side infrastructure can be identified.

(Data Logical Structure)

Figure 8:
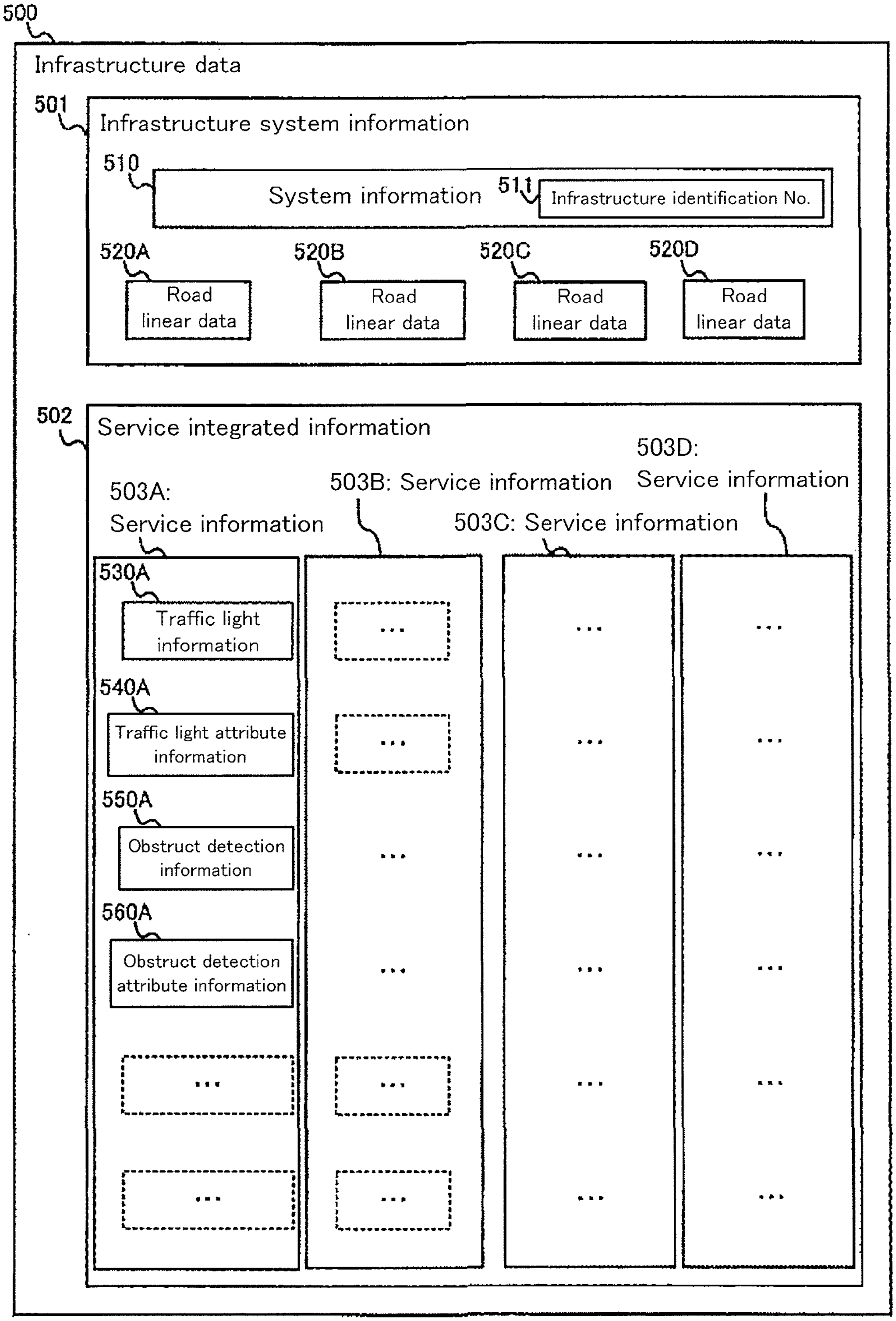
FIG. 8 is a schematic diagram showing the data logical structure of infrastructure data 500 in the first embodiment.

Now, with referenced to FIG. 8, the data logical structure of the infrastructure data 500 in the first embodiment will be explained. FIG. 8 is a schematic diagram showing the data logical structure of the infrastructure data 500 in the first embodiment.

As shown in FIG. 8, the infrastructure data 500 includes: (i) system information 510 including the infrastructure identification number 511; (ii) the four road linear data 520A, 520B, 520C, and 520D corresponding to four service routes 10A, 10B, 10C, and 10D, respectively; and (iii) four service information 503A, 503B, 503C, and 503D respectively corresponding to the four service routes.

Specifically, the infrastructure data 500 includes infrastructure system information 501 and service integrated information 502. The infrastructure system information 501 includes the system information 510 and the road linear data 520A, 520B, 520C, and 520D. The system information 510 is common system information.

The road linear data 520A, 520B, 520C, and 520D are information about the intersection which is the object of the traffic service(s) and information about road structure(s) until reaching the intersection which is the object. Moreover, the road linear data 520A, 520B, 520C, and 520D correspond to the four service routes 10A, 10B, 10C, and 10D, respectively.

The service integrated information 502 includes the service information 503A, 503B, 503C, and 503D. The service information 503A, 503B, 503C, and 503D are information about the traffic service(s). Moreover, the service information

503A, 503B, 503C, and 503D correspond to the four service routes 10A, 10B, 10C, and 10D, respectively.

The service information 503A includes traffic light information 530A, traffic light attribute information 540A, obstacle detection information 550A, and obstacle detection attribute information 560A. The traffic light information 530A is information about the light color cycle of the traffic light and the scheduled time of each color. The traffic light attribute information 540A is information about the disposed location of the traffic light. The obstacle detection information 550A is information about speeds, positions, or the number of pedestrians and vehicles and the operational situation of an obstacle sensor and detected information. The obstacle detection attribute information 560A is information about the detection range, position, or length of the obstacle sensor. Incidentally, the service information 503B, 503C, and 503D only have their different corresponding service routes but have substantially the same data structure of the service information 503A, and thus the explanation thereof will be omitted.

Moreover, the details of (i) the system information 510 including the infrastructure identification number 511; (ii) the four road linear data 520A, 520B, 520C, and 520D corresponding to four service routes 10A, 10B, 10C, and 10D, respectively; and (iiii) the four service information 503A, 503B, 503C, and 503D respectively corresponding to the four service routes, which are included in the infrastructure data 500, will be described later.

Specifically, as shown in FIG. 7, at the intersection 10 which is the object of the entry of the self-vehicle C1 in the first embodiment (hereinafter referred to as an "object intersection 10" as occasion demands), the four service routes 10A, 10B, 10C, and 10D intersect one another. The object intersection 10 is provided with the electric wave tower E10, and the electric wave tower E10 emits the electric wave holding the information about the various traffic services on the four service routes 10A, 10B, 10C, and 10D. In other words, by means of the electric wave emitted from the electric wave tower E10 provided for the object intersection 10, the traffic service(s) on the four service routes 10A, 10B, 10C, and 10D is managed. Incidentally, the four service routes 10A, 10B, 10C, and 10D constitute one example of the service road of the present invention.

The emitted electric wave can reach a communication apparatus located in a communication area A10. For example, the self-vehicle C1 provided with the obtaining part 3, such as a road-to-vehicle communication device, receives the electric wave emitted from the electric wave tower E10 in the communication area A10, and the information processing apparatus 1 installed in the self-vehicle C1 obtains the infrastructure data 500 communicated between the self-vehicle C1 and the road-side infrastructure.

More specifically, as shown in FIG. 5 described above, the infrastructure data 500 communicated between the information processing apparatus 1 installed in the self-vehicle C1 and the road-side infrastructure is temporarily stored in the main database 112 (hereinafter referred to as a "main DB" as occasion demands) for the road-to-vehicle communication data, through the format analysis part 111 of the preprocessing part 110 provided for the ECU 100 of the information processing apparatus 1.

The route information analysis part 113 selects the infrastructure system information 501 included in the infrastructure data 500 stored in the main DB 112, builds a database about the infrastructure system information 501 (hereinafter referred to as an "internal database" as occasion demands) in the route information analysis part 113, and analyzes the infrastructure system information 501.

The route information analysis part 113 outputs, to the route entry judgment DB 121, the four road linear data 520A, 520B, 520C, and 520D respectively corresponding to the four service routes included in the infrastructure system information 501 of the infrastructure data 500, and stores them in the route entry judgment DB 121. Now, go back to FIG. 6.

(Operation Principle of In-Vehicle Information Processing Apparatus: Continued)

Then, the route entry judgment part 122 provided for the route entry/deviation judgment part 120 of the ECU 100 performs a route entry judging process of judging whether or not the self-vehicle enters a special service route (step S104). In particular, on the basis of the infrastructure identification number 511 included in the system information 510 of the infrastructure data 500 and route information 525A to 525D, route numbers 526A to 526D which are assigned to the respective service routes, distances 526-1A to 526-1D from a base point(s), regulation speeds 526-2A to 526-2D, the number of driving lanes 526-3A to 526-3D, link information 526-4A to 526-4D, and node information 526-5A to 526-5D respectively included in the road linear data 520A, 520B, 520C, and 520D of the infrastructure data 500, the route entry judgment part 122 of the ECU 100 judges whether or not the self-vehicle enters the special service route. Incidentally, the road linear data 520A, 520B, 520C, and 520D will be described later, with the road linear data 520A explained as one example.

Here, the infrastructure identification number 511 in the embodiment mean a number which allows for the identification of the electric wave holding the information about the various traffic services on one or a plurality of service routes, the electric wave tower E10 for emitting the electric wave, and the object intersection 10 provided with the electric wave tower E10 for emitting the electric wave.

Incidentally, it may be judged not only whether or not the self-vehicle C1 enters the four service routes 10A, 10B, 10C, and 10D, which are managed by the object intersection 10 shown in FIG. 7 described above, from the end of each route, but also whether or not the self-vehicle C1 enters the four service routes 10A, 10B, 10C, and 10D from the middle of each route.

Specifically, as shown in FIG. 8, the infrastructure data 500 includes the infrastructure system information 501 and the service integrated information 502. The infrastructure system information 501 includes: the system information 510; and the four road linear data 520A, 520B, 520C, and 520D corresponding to the four service routes 10A, 10B, 10C, and 10D, respectively. The service integrated information 502, as described later, includes the four service information 503A, 503B, 503C, and 503D corresponding to the four service routes 10A, 10B, 10C, and 10D, respectively.

(Data Logical Hierarchy)

Figure 9:
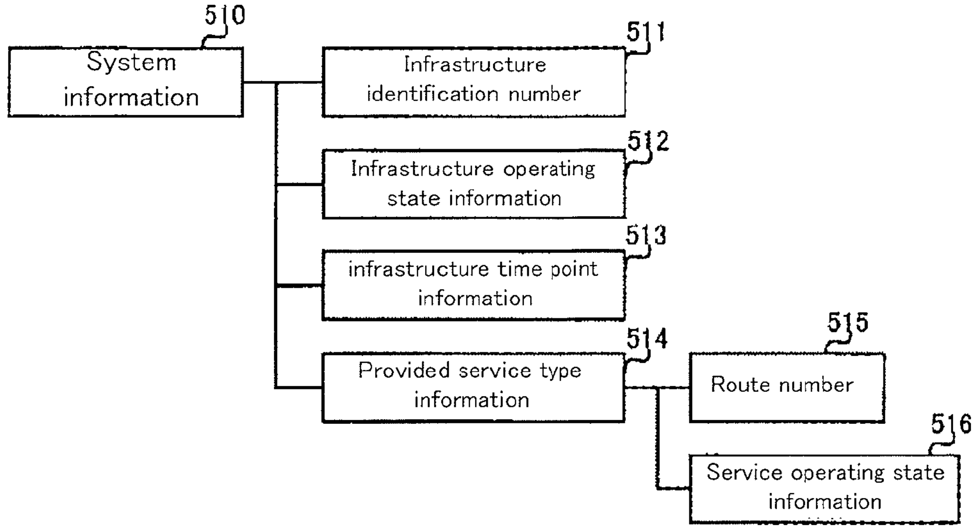
FIG. 9 is a logical hierarchy view showing the data logical hierarchy of system information 510 in the first embodiment.
Figure 10:
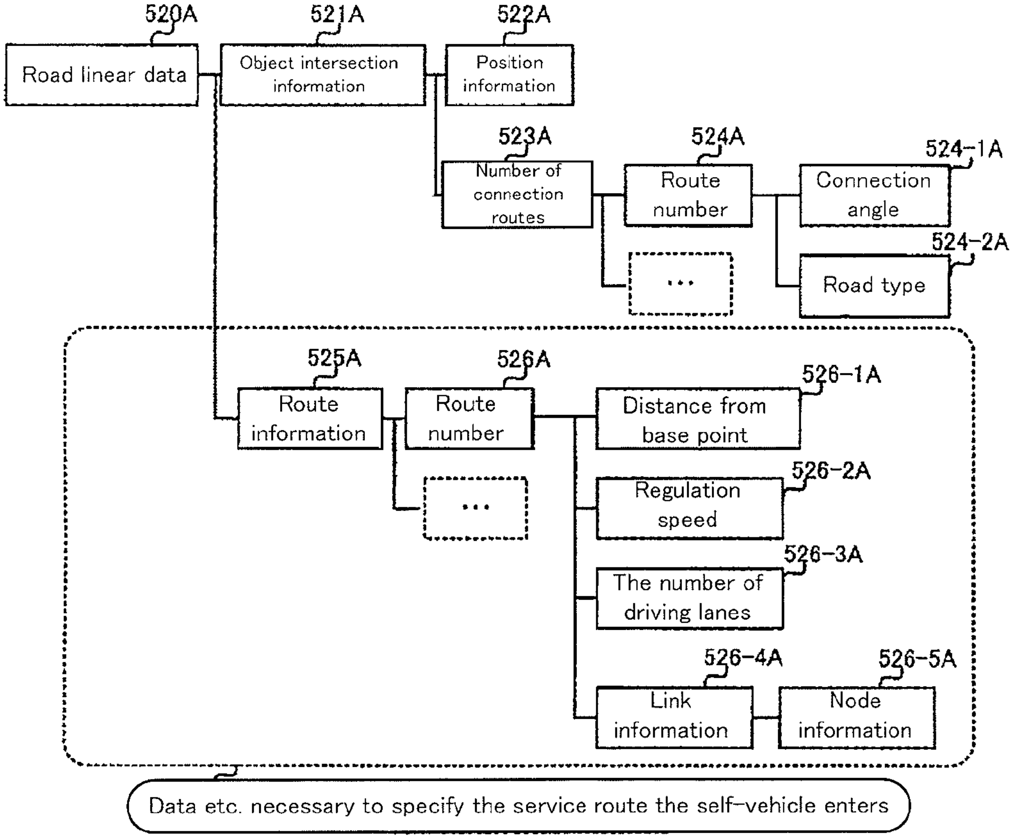
FIG. 10 is a logical hierarchy view showing the data logical hierarchy of road linear data 520A in the first embodiment.

Now, with reference to FIG. 9 and FIG. 10, the system information 510 and the road linear data 520A will be explained. FIG. 9 is a logical hierarchy view showing the data logical hierarchy of the system information 510 in the embodiment. FIG. 10 is a logical hierarchy view showing the data logical hierarchy of the road linear data 520A in the embodiment.

Specifically, the system information 510 shown in FIG. 9 is provided with the infrastructure identification number 511, infrastructure operating state information 512, infrastructure time point information 513, provided service type information 514, a route number 515, and service operating state information 516.

Specifically, the road linear data 520A shown in FIG. 10 is provided with object intersection information 521A and the route information 525A. The object intersection information 521A includes position information 522A, the number of connection routes 523A, a route number 524A, a connection angle 524-1A, and a road type 524-2A.

The route information 525A includes the route number 526A assigned to each service route, the distance 526-1A from the base point, the regulation speed 526-2A, the number of driving lanes 526-3A, the link information 526-4A, and the node information 526-5A.

Incidentally, since the data logical hierarchies of the road linear data 520B, 520C, and 520D described above are the same as that of the road linear data 520A, the explanation thereof will be omitted. Now, go back to FIG. 6.

(Operation Principle of In-Vehicle Information Processing Apparatus: Continued)

Then, the route entry judgment part 122 provided for the route entry/deviation judgment part 120 of the ECU 100 judges whether or not the entry to the special service route 10A is determined (step S105). Here, if it is judged that the entry to the special service route 10A is determined (the step S105: Yes), then, under the control of the ECU 100, the infrastructure data 500 corresponding to the determined special service route is extracted, analyzed, and compiled into a database (step S106).

Specifically, by means of the weighting part 140, the weighting information indicating the most importance for providing the various traffic service(s) in association with the service route 10A is assigned to the road linear data 520A about the special service route 10A and the service information 503A corresponding to the service route 10A, out of the data included in the infrastructure data. By this, the ECU 100 can preferentially perform the information processing on the road linear data 520A and the service information 503A included in the received infrastructure data. In other words, the ECU 100 can perform the information processing on the road linear data 520A and the service information 503A included in the received infrastructure data, in preference to other data other than the road linear data 520A and the service information 503A out of the data included in the infrastructure data. This makes it possible to reduce the operation load of the information processing in comparison with the case where the information processing is performed on all the data included in the infrastructure data. By this, it is possible to perform the information processing, quickly and appropriately, when the self-vehicle C1 enters the service route and provides the various traffic service(s) while driving.

Figure 11:
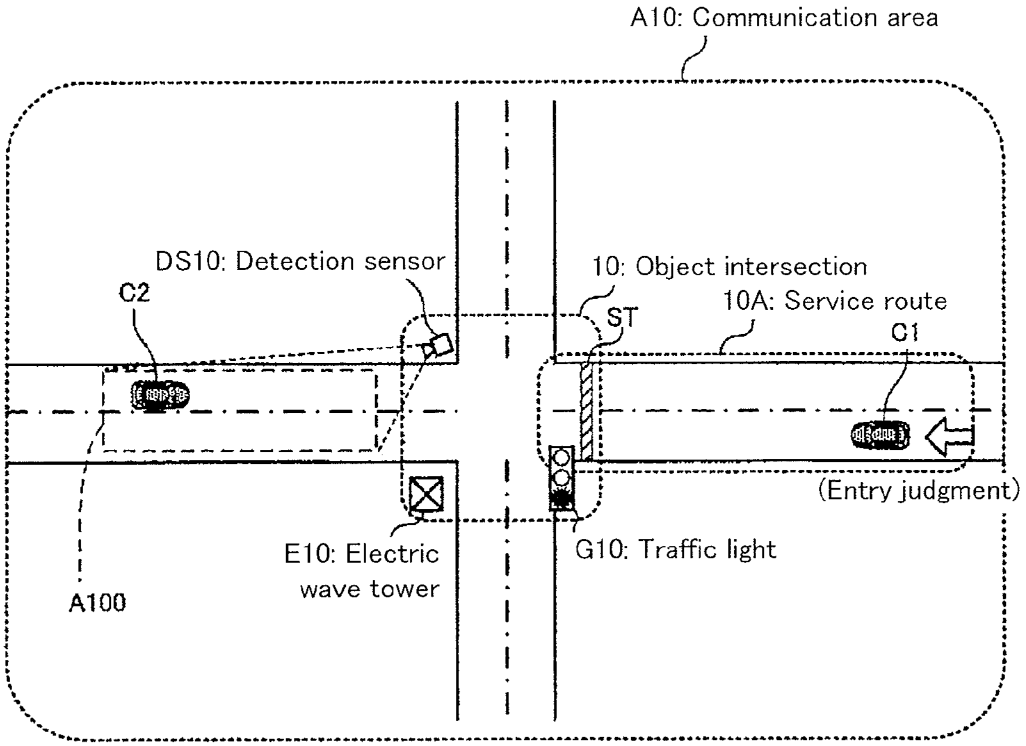
FIG. 11 is a schematic diagram showing a situation in which the self-vehicle with the information processing apparatus in the first embodiment installed drives after the entry to the service route is determined.
Figure 11:
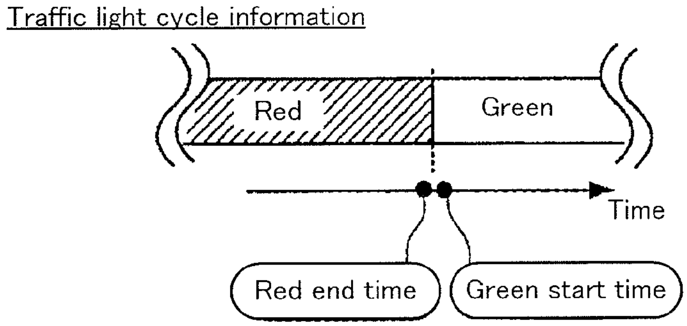

More specifically, FIG. 11 is a schematic diagram showing a situation in which the self-vehicle with the information processing apparatus in the first embodiment installed drives after the entry to the service route is determined.

As shown in FIG. 11, under the control of the ECU 100, if it is determined that the self-vehicle C1 enters the service route 10A, then, the information about the object intersection 10 and the service route 10A, i.e. the system information 510, the road linear data 520A corresponding to the service route 10A, and the service information 503A corresponding to the service route 10A are extracted from the infrastructure data 500, are analyzed, and are compiled into a database. On the other hand, the information about the service routes 10B, 10C, and 10D, i.e. the road linear data 520B, 520C, and 520D, and the service information 503B, 503C, and 503D, is not extracted from the infrastructure data 500.

This makes it possible to reduce a storage capacity for the database compilation and to reduce the load in the information processing of the ECU 100.

More specifically, as shown in FIG. 5 described above, the route entry judgment part 122 provided for the route entry/deviation judgment part 120 of the ECU 100 notifies the route information analysis part 113 of the route number 526 by which the determined special service 10A can be uniquely identified.

The route information analysis part 113 outputs the road linear data 520A corresponding to the determined special service route 10A to the route deviation judgment DB 123 on the basis of the notified route number 526, and stores it in the route deviation judgment DB 123.

(Flow of Data in Driving Assistance Services)

The route information analysis part 113 outputs, to a object intersection information analysis part 114, the system information 510 and the road linear data 520A corresponding to the determined special service route 10A on the basis of the notified route number 526.

The object intersection information analysis part 114 selects, extracts, and reprocesses the service information 503A corresponding to the determined special service route 10A, out of the service integrated information 502 included in the infrastructure data 500 stored in the main DB 112. Then, the object intersection information analysis part 114 outputs, to the object intersection DB 151, the traffic light information 530A, the traffic light attribute information 540A, the obstacle detection information 550A, and the obstacle detection attribute information 560A, which are included in the selected service information 503A, together with the system information 510 and the road linear data 520A corresponding to the determined special service route 10A, and stores them in the object intersection DB 151.

(Importance of Information)

Now, with reference to FIG. 12, the importance of the information in the first embodiment will be explained. FIG. 12 are a table showing the information which is important in the route entry judgment in the first embodiment (FIG. 12(*a*)) and a table showing the information which is important in the route deviation judgment (FIG. 12(*b*)).

As described above, the weighting part 140 assigns, to the received infrastructure data, the weighting information indicating the importance for specifying the service route that the self-vehicle C1 enters and indicating the importance for providing the aforementioned traffic service(s) in association with the service route.

For example, like the self-vehicle C1 in FIG. 7 described above, if the self-vehicle enters the communication area A10 from the right side of FIG. 7 and performs the route entry judgment, the road linear data 520A, 520B, 520C, and 520D are preferably set to be more important than the service integrated information 502 and set as the object of the information processing, as shown in FIG. 12(*a*). This is because the service integrated information 502 is less necessary in the route entry judgment. By this, since the data as the object of the information processing is selected in accordance with the purpose of determining the entry of the self-vehicle C1 to the special service route, it is possible to improve the efficiency of the information processing, thereby improving the speed of the information processing.

Moreover, even in the road linear data which is more important than the service information 503A, the importance may be set in accordance with distance from the self-vehicle C1, and the importance may be set to be high in order of the road linear data 520A, 520B, 520C, and 520D.

On the other hand, for example, like the self-vehicle C1 in FIG. 11 described above, if a judgment of deviation from the service route 10A is performed, the road linear data 520A and the service information 503A corresponding to the service route 10A are preferably set to be more important than the road linear data 520B, 520C, and 520D and set to be the object of the information processing, as shown in FIG. 12(*b*). This is because the road linear data 520B, 520C, and 520D are less necessary in the judgment of the route deviation from the service route 10A. Incidentally, the descending order of the importance shown in FIG. 12(*a*) and FIG. 12(*b*) and numbers "1", "2", "3", "4", and "5" indicating the descending order of the importance constitute one example of the "weighting information" of the present invention.

(Data Logical Hierarchy of Service Information 503A)

Figure 13:
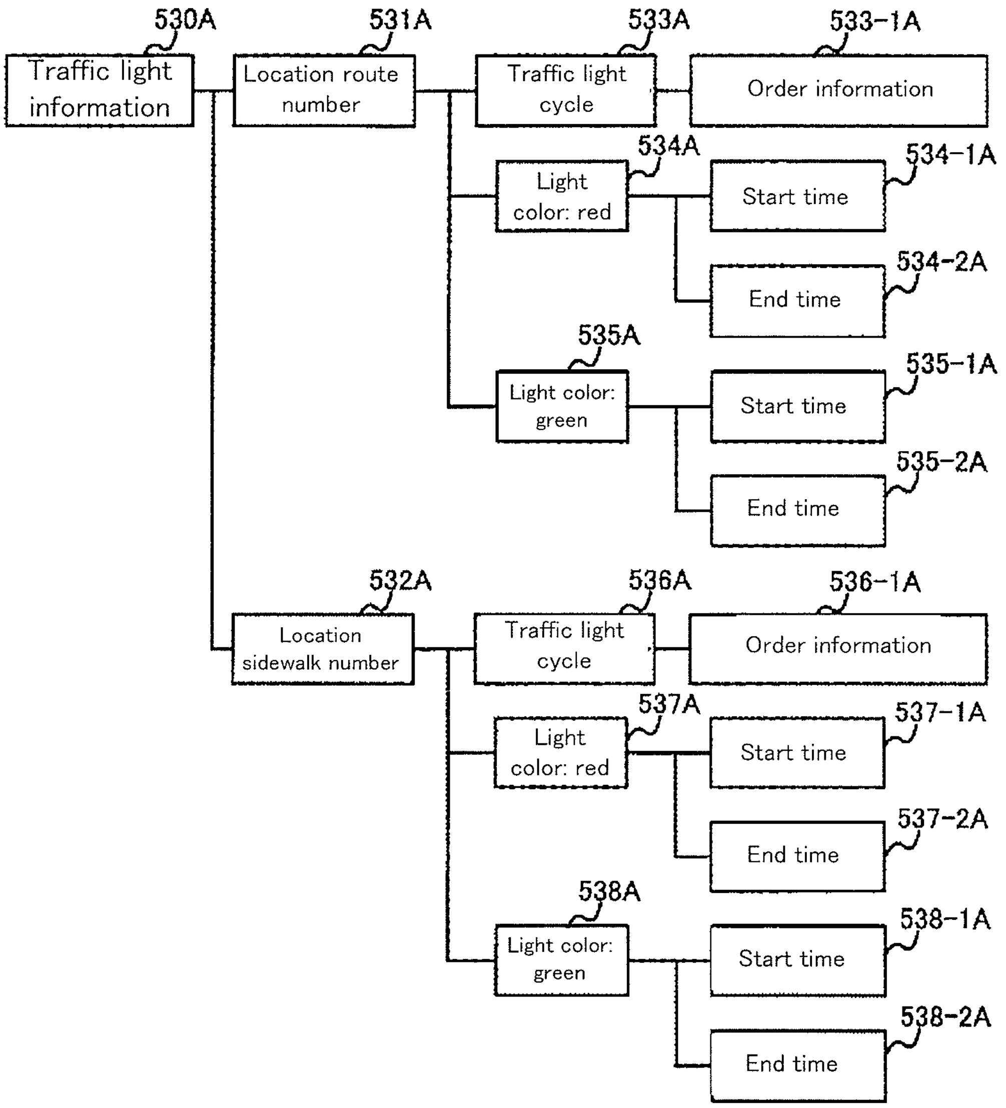
FIG. 13 are a schematic diagram showing the data logical hierarchy of traffic light information 530A included in service information 503A in the first embodiment (FIG. 13(*a*)) and a schematic diagram showing the data logical hierarchy of traffic light attribute information 540A (FIG. 13(*b*)).
Figure 13:
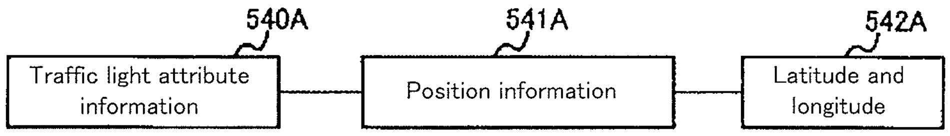
Figure 14:
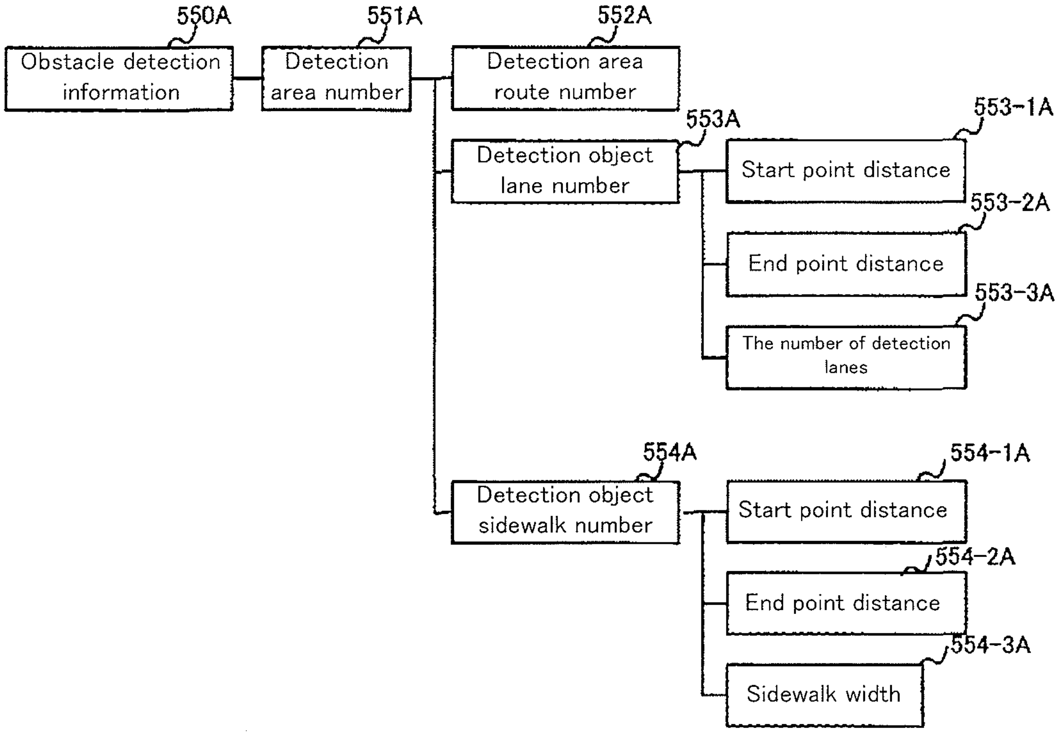
FIG. 14 is a schematic diagram showing the data logical hierarchy of obstacle detection information 550A included in the service information 503A in the first embodiment.
Figure 15:
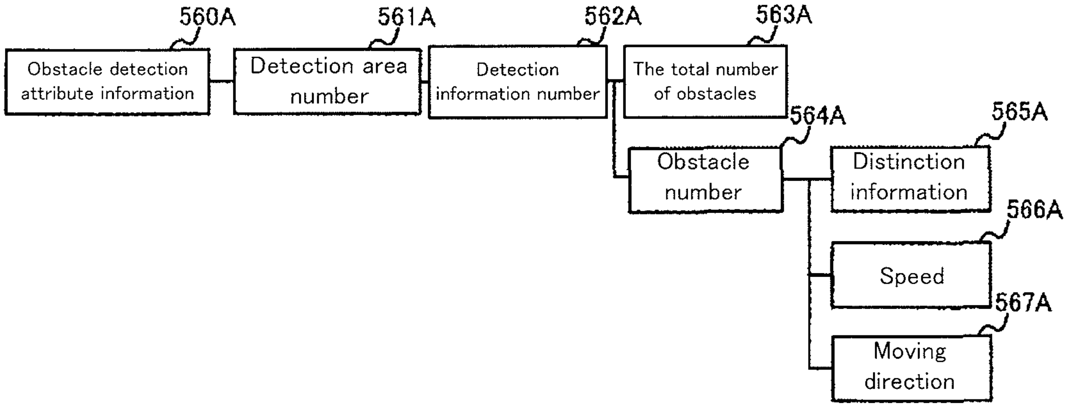
FIG. 15 is a schematic diagram showing the data logical hierarchy of obstacle detection attribute information 560A included in the service information 503A in the first embodiment.

Now, with reference to FIG. 13 to FIG. 15, the service information 503A in the first embodiment will be explained. FIG. 13 are a schematic diagram showing the data logical hierarchy of the traffic light information 530A included in the service information 503A in the first embodiment (FIG. 13(*a*)) and a schematic diagram showing the data logical hierarchy of the traffic light attribute information 540A (FIG. 13(*b*)). FIG. 14 is a schematic diagram showing the data logical hierarchy of the obstacle detection information 550A included in the service information 503A in the first embodiment. FIG. 15 is a schematic diagram showing the data logical hierarchy of the obstacle detection attribute information 560A included in the service information 503A in the first embodiment.

(Traffic Light Information)

As shown in FIG. 13(*a*), the traffic light information 530A is provided with location route numbers 531A and 532A as the first hierarchy. As the second hierarchy, it is provided with a traffic light cycle 533A, a red light color 534A, a green light color 535A. As the third hierarchy, it is provided with order information 533-1A such as "red-green-yellow-arrow" as the traffic light cycle, start time 534-1A and end time 534-2A for the red light color, and start time 535-1A and end time 535-2A for the green light color.

Substantially in the same manner, correspondingly to the location route number 532A, as the second hierarchy, a traffic light cycle 536A, a red light color 537A, a green light color 538A are provided. As the third hierarchy, order information 536-1A such as "red-green-flash" as the traffic light cycle, start time 537-1A and end time 537-2A for the red light color, and start time 538-1A and end time 538-2A for the green light color are provided.

As shown in FIG. 13(*b*), the traffic light attribute information 540A is provided with position information 541A as the first hierarchy. As the second hierarchy, latitude and longitude 542A of the traffic light is provided.

Incidentally, the information may be used for the red light overlooking prevention service, the traffic light passing assistance service, and the like, as a service using traffic lights.

(Obstacle Detection Information)

As shown in FIG. 14, the obstacle detection information 550A is provided with a detection area number 551A, as the first hierarchy. As the second hierarchy, it is provided with a detection area route number 552A, a detection object lane number 553A, and a detection object sidewalk number 554A. As the third hierarchy, it is provided with start point distance 553-1A, end point distance 553-2A, and the number of detection lanes 553-3A, which correspond to the detection object lane number 553A. Moreover, as the third hierarchy, start point distance 554-1A, end point distance 554-2A, and a sidewalk width 554-3A, which correspond to the detection object sidewalk number 554A, are provided.

As shown in FIG. 15, the obstacle detection attribute information 560A is provided with a detection area number 561A as the first hierarchy. As the second hierarchy, a detection information number 562A is provided. As the third hierarchy, the total number of obstacles 563A and an obstacle number 564A are provided. As the fourth hierarchy, it is provided with distinction information 565A about a vehicle type or pedestrians, a speed 566A, and a moving direction 567A.

Incidentally, the information may be used for a service for preventing collision in turning right, a service for preventing collision with pedestrian, and the like, as a service for detecting the obstacle. Now, go back to FIG. 6.

(Operation Principle of In-Vehicle Information Processing Apparatus: Continued)

Then, the route deviation judgment part 124 of the ECU 100 performs a route deviation judging process of judging whether or not the self-vehicle deviates from the determined special service route 10A described above (step S107).

Then, the route deviation judgment part 124 of the ECU 100 judges whether or not the self-vehicle deviates from the determined special service route 10A described above (step S108). Specifically, the route deviation judgment part 124 judges whether or not the self-vehicle deviates from the special service route 10A on the basis of the road linear data 520A stored in the route deviation judgment DB 123, i.e. the road linear data 520A corresponding to the determined special service route 10A, and a driving distance on the determined special service route 10A.

More specifically, the driving distance estimation part 125 included in the route deviation judgment part 124 estimates the driving distance on the determined special service route 10A on the basis of the road linear data 520A corresponding to the determined special service route 10A and the information about the position of the self-vehicle. The estimated driving distance enables the route deviation judgment part 124 to judge whether or not the self-vehicle deviates from the special service route 10A.

Specifically, as shown in FIG. 5 described above, the route deviation judgment part 124 outputs, to the object intersection information analysis part 114, route deviation information about the judgment of whether or not the self-vehicle deviates from the special service route 10A. At the same time, or before or after that, the route deviation judgment part 124 outputs, to the service route DB 152, the route deviation information about the judgment of whether or not the self-vehicle deviates from the special service route 10A, information about the estimated driving distance, and information about the accuracy of a driving path on the service route based on the estimated driving distance with respect to the actual driving path of the self-vehicle, and stores them in the service route DB 152. Now, go back to FIG. 6.

(Operation Principle of In-Vehicle Information Processing Apparatus: Continued)

As a result of the judgment in the step S108 described above, if the route deviation judgment part 124 of the ECU 100 judges that the self-vehicle deviates from the determined special service route 10A described above (the step S108: Yes), the ECU 100 judges whether or not the information processing part 1 can communicate with the road-side infrastructure (step S109). Here, if it is judged that the information processing part 1 can communicate with the road-side infrastructure (the step S109: Yes), the various DBs are held by the ECU 100 (step S110), and the route entry judgment part 122 of the ECU 100 performs the route entry judging process of judging whether or not the self-vehicle enters the special service route 10A, as described above (the step S104).

Figure 16:
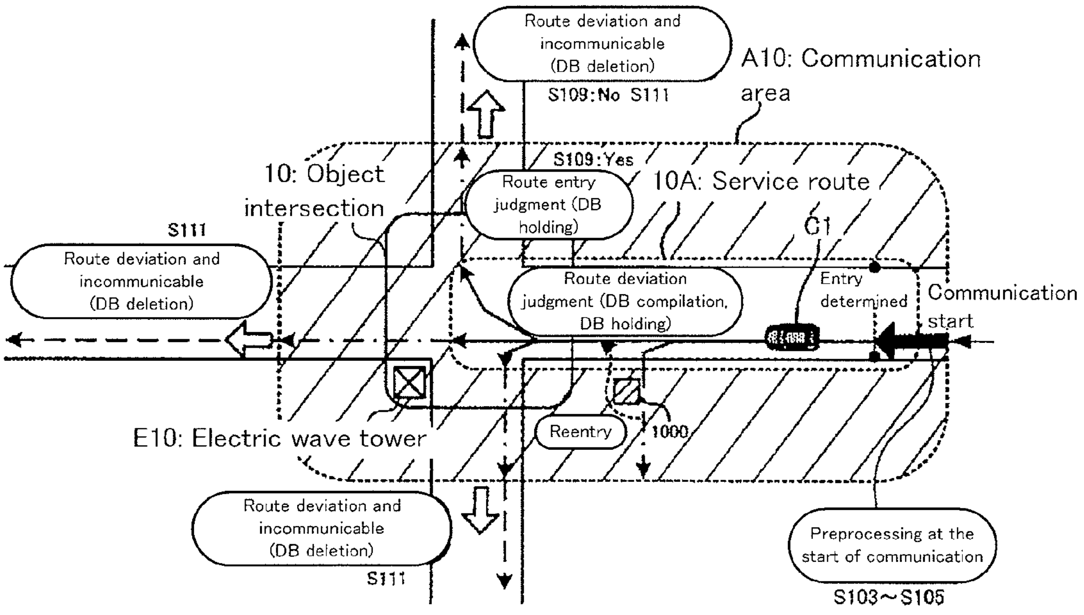
FIG. 16 are a schematic diagram showing three types of states, which are a state in which the self-vehicle with the information processing apparatus in the first embodiment installed enters a service route 10A, a state in which the self-vehicle deviates from the service route 10A, and a state in which the self-vehicle cannot perform the communication through an electric wave emitted from an electric wave tower E10 at an object intersection 10 (FIG. 16(*a*)) and a table showing truth values for holding or deleting DBs (FIG. 16(*b*)).

A specific example when the various DBs are held will be explained with reference to FIG. 16. FIG. 16 are a schematic diagram showing three types of states, which are a state in which the self-vehicle with the information processing apparatus in the first embodiment installed enters the service route 10A, a state in which the self-vehicle deviates from the service route 10A, and a state in which the self-vehicle cannot perform the communication through the electric wave emitted from the electric wave tower E10 disposed at the object intersection 10 (FIG. 16(*a*)) and a table showing truth values for holding or deleting the DB (FIG. 16(*b*)). Incidentally, "1" in FIG. 16(*b*) indicates that a condition in an item of the table is true, and "0" indicates that a condition in an item of the table is false.

On the other hand, as a result of the judgment in the step S105 described above, if it is not judged that the entry to the special service route 10A is determined (the step S105: No), as described above, the route entry judgment part 122 provided for the ECU 100 performs the route entry judging process of judging whether or not the self-vehicle enters the special service route, as described above (the step S104).

(Preprocessing)

As indicated by a black arrow in FIG. 16(*a*), after the start of the communication between the information processing apparatus 1 and the road-side infrastructure, the infrastructure data 500 is obtained through the communication between the information processing apparatus 1 and the road-side infrastructure and is compiled into a database, i.e. preprocessing is performed, until the entry to the service route 10A is determined (refer to the step S103 to the step S105 described above).

(Self-Vehicle C1 in Service Route 10A)

As indicated by the self-vehicle C1 in the service route 10A in FIG. 16(*a*), after the entry to the special service route 10A is determined by the route entry judgment part 122 of the ECU 100 of the information processing apparatus 1 installed in the self-vehicle C1 (refer to (the step S105: Yes) described above), the information about the determined special serviced route 10A and the object intersection 10, i.e. the system information 510, the road linear data 520A corresponding to the service route 10A, and the service information 503A corresponding to the service route 10A are extracted from the infrastructure data 500, are analyzed, and are compiled into a database, and then it is judged whether or not the self-vehicle deviates from the service route 10A (refer to the step S106 to the step S108 described above). Incidentally, of course, with the database compilation, the various DBs are held.

(Self-Vehicle C1 in Communication Area A10)

If the self-vehicle C1 drives in the communication area A10 hatched or marked with oblique lines in FIG. 16(*a*), it is judged whether or not the information processing apparatus 1 can communicate with the road-side infrastructure, and the various DBs are held while the entry to the special service route is judged (refer to the step S109, the step S110, and the step S105 and the like).

(Reentry)

Incidentally, as indicated by a dotted arrow in FIG. 16(*a*), if the self-vehicle C1 reenters the service route 10A from the communication area A10 hatched or marked with the oblique lines in FIG. 16(*a*), since the various DBs are held, the system information 510, the road linear data 520A, and the service information 503A can be extracted from the infrastructure data 500, can be analyzed, and can be quickly compiled into a database. Now, go back to FIG. 6.

(Operation Principle of In-Vehicle Information Processing Apparatus: Continued)

On the other hand, as a result of the judgment in the step S109 described above, if it is not judged that the information processing part 1 can communicate with the road-side infrastructure, in other words, if it is judged that the information processing part 1 cannot communicate with the road-side infrastructure (the step S109: No), the ECU 100 deletes the main database 112, the internal database in the route information analysis part 113, the route entry judgment DB 121, the route deviation judgment DB 123, the object intersection DB 151, and the service route DB 152 (step S111).

Specifically, as indicated by white arrows in FIG. 16(*a*), if the self-vehicle C1 deviates from the service route 10A and if the information processing apparatus 1 of the self-vehicle C1 cannot receive the electric wave emitted from the electric wave tower E10 disposed at the object intersection 10, the ECU 100 deletes the various DBs described above.

On the other hand, as a result of the judgment in the step S108 described above, if the route deviation judgment part 124 of the ECU 100 does not judge that the self-vehicle deviates from the determined special service route described above, in other words, if it judges that the self-vehicle does not deviate from the determined special service route described above (the step S108: No), the holding of the various DBs by the ECU 100 is continued (step S112). Then, under the control of the ECU 100, the infrastructure data 500 corresponding to the determined special service route is extracted, analyzed, and continuously compiled into a database (the step S106).

Figure 17:
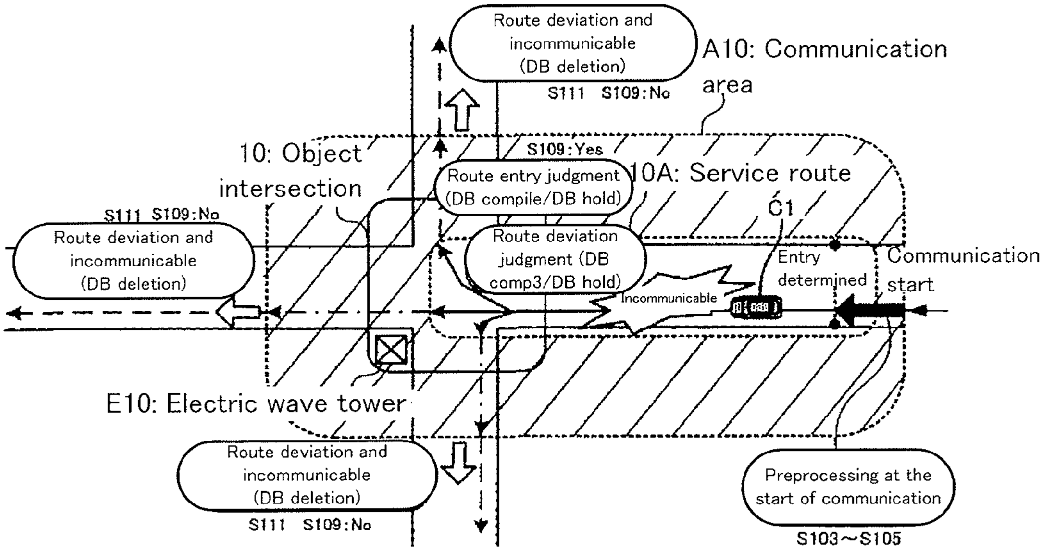
FIG. 17 is a schematic diagram showing a situation in which the self-vehicle with the information processing apparatus in the first embodiment installed cannot receive the electric wave emitted from the electric wave tower E10 disposed at the object intersection 10 while driving on the service route 10A.

As described above, if it is judged that the self-vehicle does not deviate from the special service route, then, under the control of the ECU 100, the holding of the various DBs is continued, the infrastructure data 500 corresponding to the determined special service route is extracted, analyzed, and continuously compiled into a database. Thus, as shown in FIG. 17, even in the case of suddenly losing the communication while the self-vehicle is driving in the special service route 10A, the information processing can be stably performed. Here, FIG. 17 is a schematic diagram showing a situation in which the self-vehicle with the information processing apparatus in the first embodiment installed cannot receive the electric wave emitted from the electric wave tower E10 disposed at the object intersection 10 while driving on the service route 10A.

(Holding and Deletion of Databases)

Now, particularly the holding and the deletion of the various DBs in the first embodiment will be explained with reference to FIG. 16(*b*).

As shown in FIG. 16(*b*), (*i*) if a condition that the route entry of the self-vehicle C1 to the service route is determined is "1: True" and if a condition that the information processing apparatus 1 of the self-vehicle C1 can receive the electric wave emitted from the electric wave tower E10 disposed at the object intersection 10 is "1: True", then, the holding of the DBs is "1: True", i.e. the various DBs described above are held.

In particular, whether or not the route entry of the self-vehicle C1 to the service route is determined may be judged on the basis of the estimated position of the self-vehicle C1 by the GPS and the estimated driving distance on the service route.

(ii) If the condition that the route entry of the self-vehicle C1 to the service route is determined is "1: True" and if the condition that the information processing apparatus 1 of the self-vehicle C1 can receive the electric wave emitted from the electric wave tower E10 disposed at the object intersection 10 is "0: False", then, the holding of the DBs is "1: True", i.e. the various DBs described above are held.

By this, as shown in FIG. 17 described above, even in the case of suddenly losing the communication while the self-vehicle is driving in the special service route, the information processing can be stably performed as shown in FIG. 17. Thus, it is extremely useful in practice.

(ii) If the condition that the route entry of the self-vehicle C1 to the service route is determined is "0: False" and if the condition that the information processing apparatus 1 of the self-vehicle C1 can receive the electric wave emitted from the electric wave tower E10 disposed at the object intersection 10 is "1: True", then, the holding of the DBs is "1: True", i.e. the various DBs described above are held.

As described above, if the electric wave emitted from the electric wave tower E10 can be received even though it is judged that the self-vehicle deviates from the special service route, then, under the control of the ECU 100, the holding of the various DBs is continued, the infrastructure data 500 corresponding to the determined special service route is extracted, analyzed, and continuously compiled into a database. By this, as indicated by the dotted arrow in FIG. 16(*a*), even if the self-vehicle C1, while driving in the special service route 10A, suddenly stops over at a facility 1000 outside the service route 10A, temporarily deviates from the service route 10A and reenters it, the various DBs already held can be reused. Thus, it is possible to improve the efficiency of the information processing.

(iv) If the condition that the route entry of the self-vehicle C1 to the service route is determined is "0: False" and if the condition that the information processing apparatus 1 of the self-vehicle C1 can receive the electric wave emitted from the electric wave tower E10 disposed at the object intersection 10 is "0: False", then, the holding of the DBs is "0: False", i.e. the various DBs described above are deleted.

As a result, only the data corresponding to the service route on which the self-vehicle drives is stored. Thus, it is possible to effectively prevent the expansion of the information amount of the data which is the object of the information processing. This makes it possible to effectively reduce the operation load on the information processing apparatus 1 of the self-vehicle C1, and thus it is extremely useful in practice.

Second Embodiment

Figure 18:
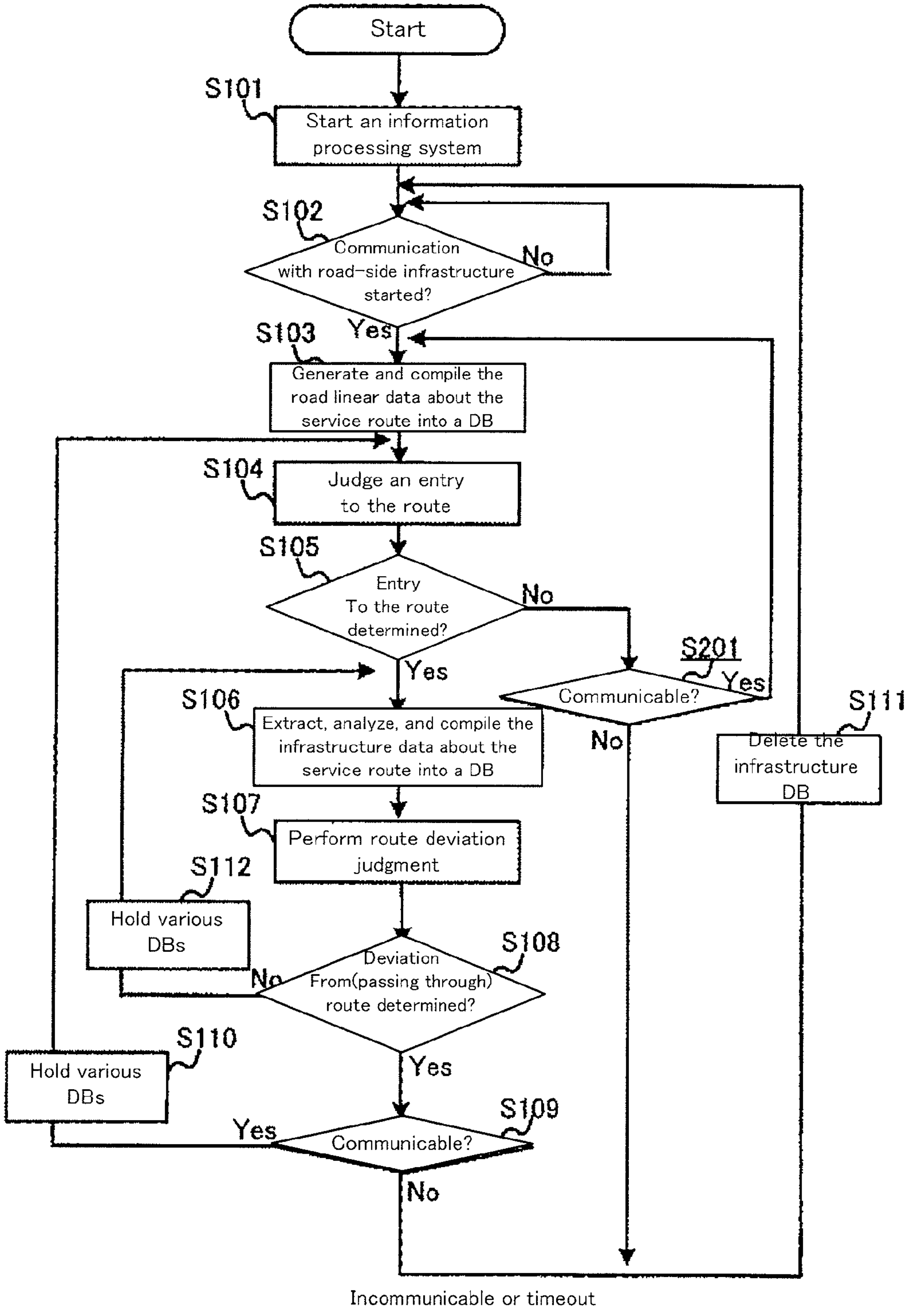
FIG. 18 is a flowchart showing a flow of the information processing on an in-vehicle information processing apparatus in a second embodiment.
Figure 19:
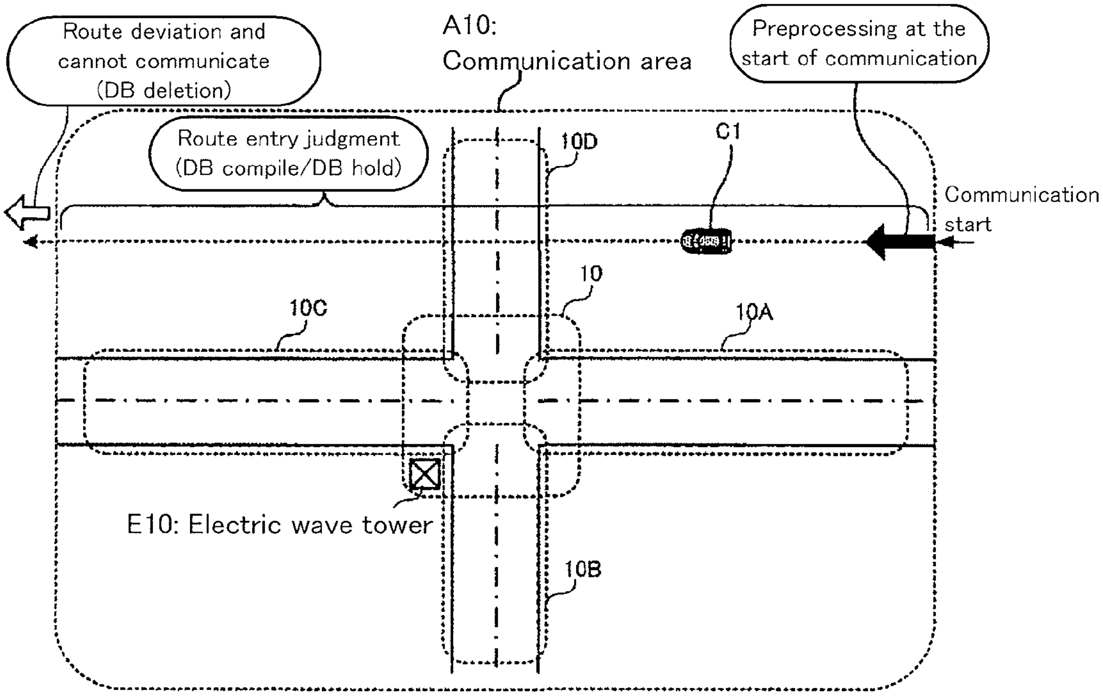
FIG. 19 is a schematic diagram showing a situation in which a self-vehicle with the information processing apparatus in the second embodiment installed passes through a communication area without entering the service route.

Next, with reference to FIG. 18 and FIG. 19, an explanation will be given on information processing on an in-vehicle information processing apparatus in a second embodiment. FIG. 18 is a flowchart showing a flow of the information processing on the in-vehicle information processing apparatus in the second embodiment. FIG. 19 is a schematic diagram showing a situation in which a self-vehicle with the information processing apparatus in the second embodiment installed passes through the communication area without entering the service route. Incidentally, in the second embodiment, substantially the same constituents as those in the first embodiment described above will carry substantially the same reference numerals, and the explanation thereof will be omitted as occasion demands. In addition, in the second embodiment, substantially the same processes as those in the first embodiment described above will carry substantially the same step numbers, and the explanation thereof will be omitted as occasion demands.

Through the step S101, the step S102, the step S103, and the step S104 described above, the route entry judgment part 122 provided for the route entry/deviation judgment part 120 of the ECU 100 judges whether or not the entry to the special service route 10A is determined (the step S105). Here, if it is not judged that the entry to the special service route 10A is determined (the step S105: No), under the control of the ECU 100, it is judged whether or not the information processing apparatus 1 can communicate with the road-side infrastructure (step S201). Here, if it is judged that the communication is possible (the step S201: Yes), under the control of the ECU 100, the infrastructure data 500 is obtained through the communication between the information processing apparatus 1 and the road-side infrastructure and is compiled into a database (the step S103).

On the other hand, as a result of the judgment in the step S201 described above, if it is not judged that the communication is possible (the step S201: No), the ECU 100 deletes the main database 112, the internal database in the route information analysis part 113, the route entry judgment DB 121, the route deviation judgment DB 123, the object intersection DB 151, and the service route DB 152 (the step S111).

In other words, as shown in FIG. 19, if the entry of the self-vehicle C1 to the special service route is not determined and if the information processing apparatus 1 can receive the electric wave emitted from the electric wave tower E10 disposed at the object intersection 10, then, under the control of the ECU 100, the road linear data 520A, 520B, 520C, and 520D about all the service routes out of the infrastructure data 500 held by the electric wave are obtained through the communication between the information processing apparatus 1 and the road-side infrastructure and are compiled into a database. At the same time, the route entry judging process of judging whether or not the self-vehicle enters the special service route is performed. In another viewpoint, the service integrated information 502 included in the infrastructure data 500 held by the electric wave may be designed such that its database compilation is not performed by the information processing apparatus 1.

As described above, until the entry of the self-vehicle C1 to the special service route is determined, only the data necessary to determine the entry to the special service route out of the infrastructure data 500 is the object of the database compilation. In other words, for the purpose of determining the entry of the self-vehicle C1 to the special service route, the data that is essential to achieve this purpose, which is typically the road linear data 520A, 520B, 520C, and 520D, is obtained, and advanced and complicated information processing such as the database compilation is performed. On the other hand, with respect to other data that is less necessary or unnecessary to achieve the purpose of determining the entry of the self-vehicle C1 to the special service route, which is typically the service integrated information 502, the advanced and complicated information processing such as the database compilation is not performed.

As described above, since the data as the object of the information processing is selected in accordance with the purpose of determining the entry of the self-vehicle C1 to the special service route, it is possible to improve the efficiency of the information processing, thereby improving the speed of the information processing.

Third Embodiment

Figure 20:
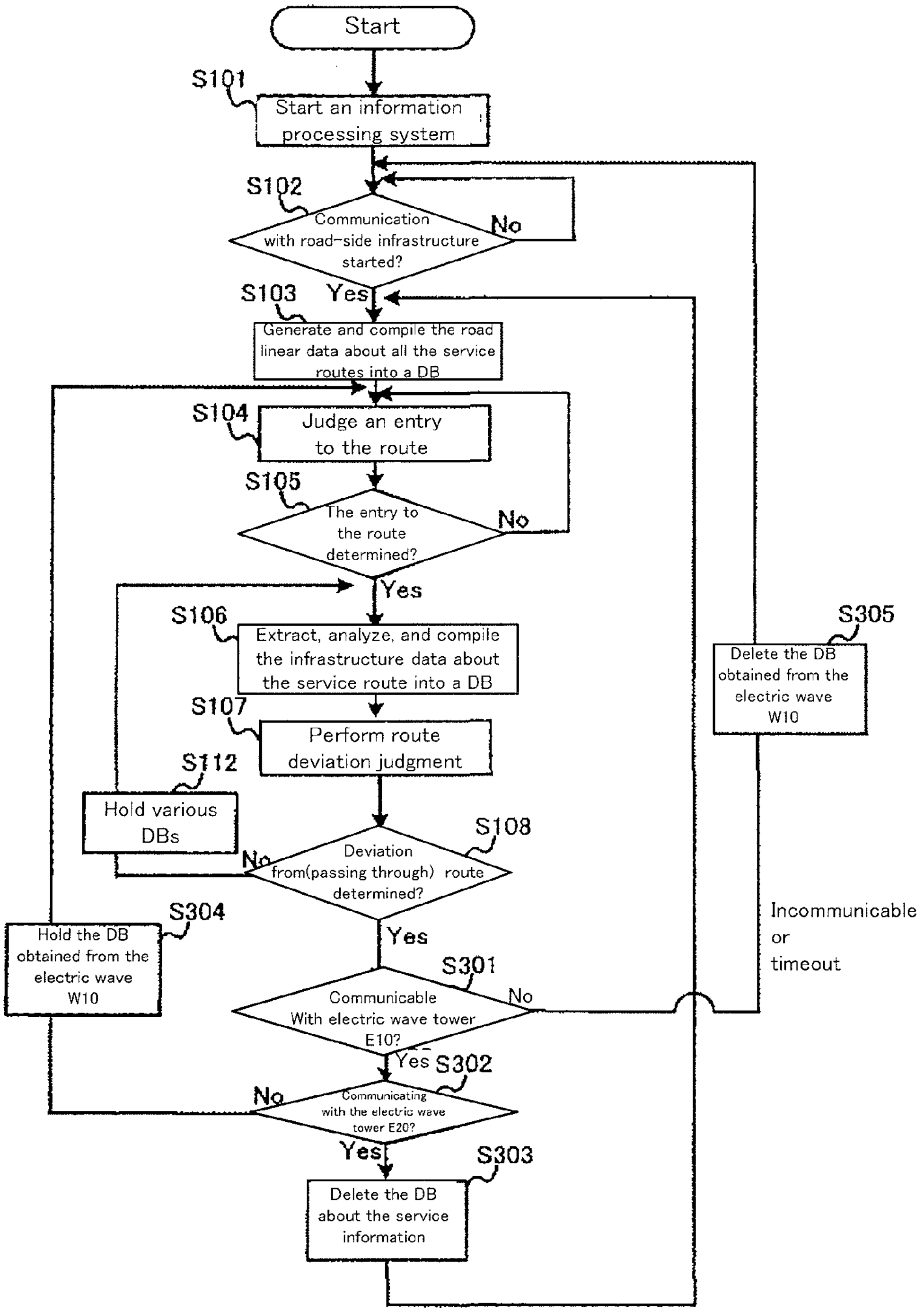
FIG. 20 is a flowchart showing a flow of the information processing on an in-vehicle information processing apparatus in a third embodiment.
Figure 21:
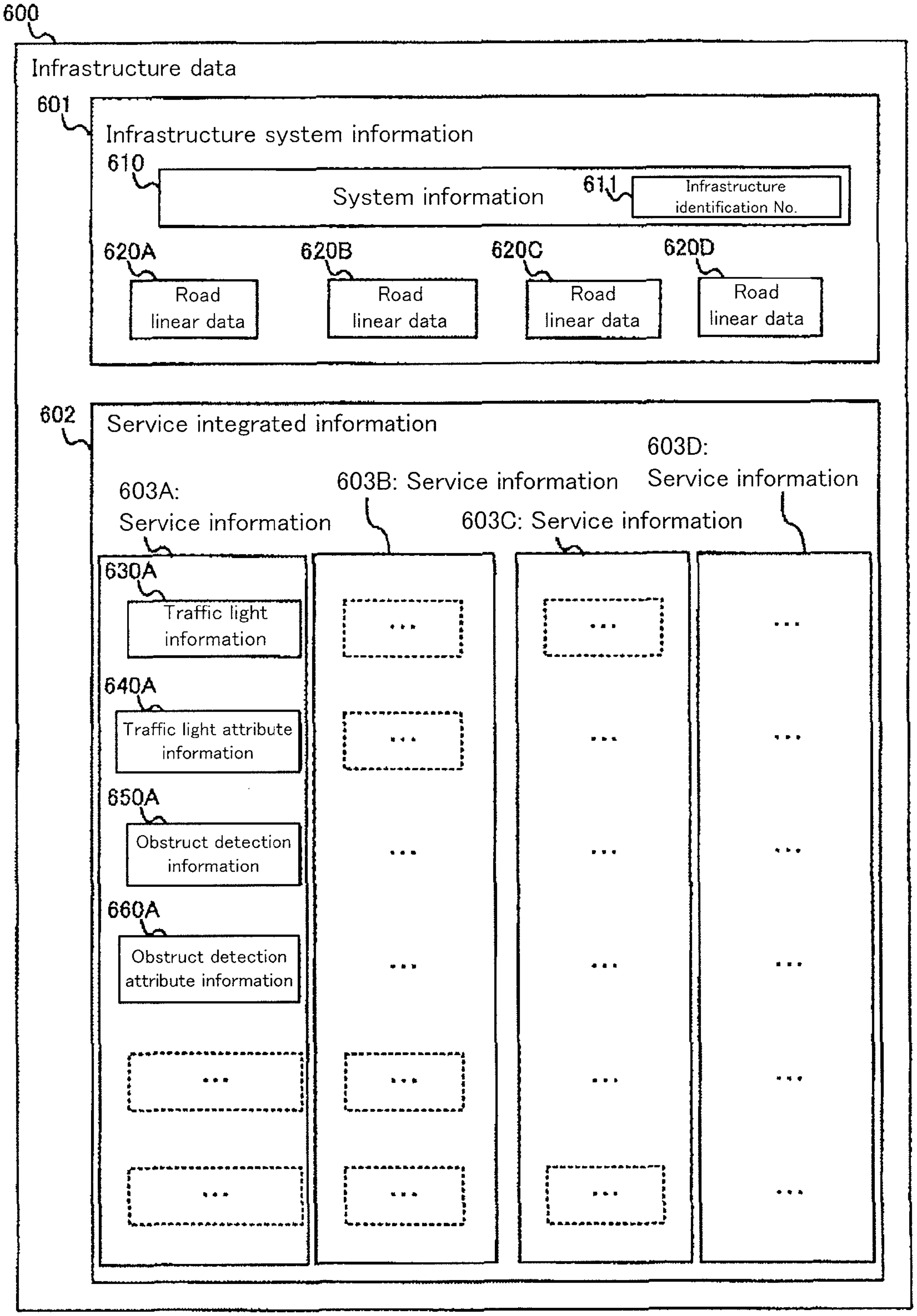
FIG. 21 is a schematic diagram showing the data logical structure of infrastructure data 600 held by an electric wave W20 emitted from an electric wave tower E20 provided at an object intersection 20 in the third embodiment.
Figure 22:
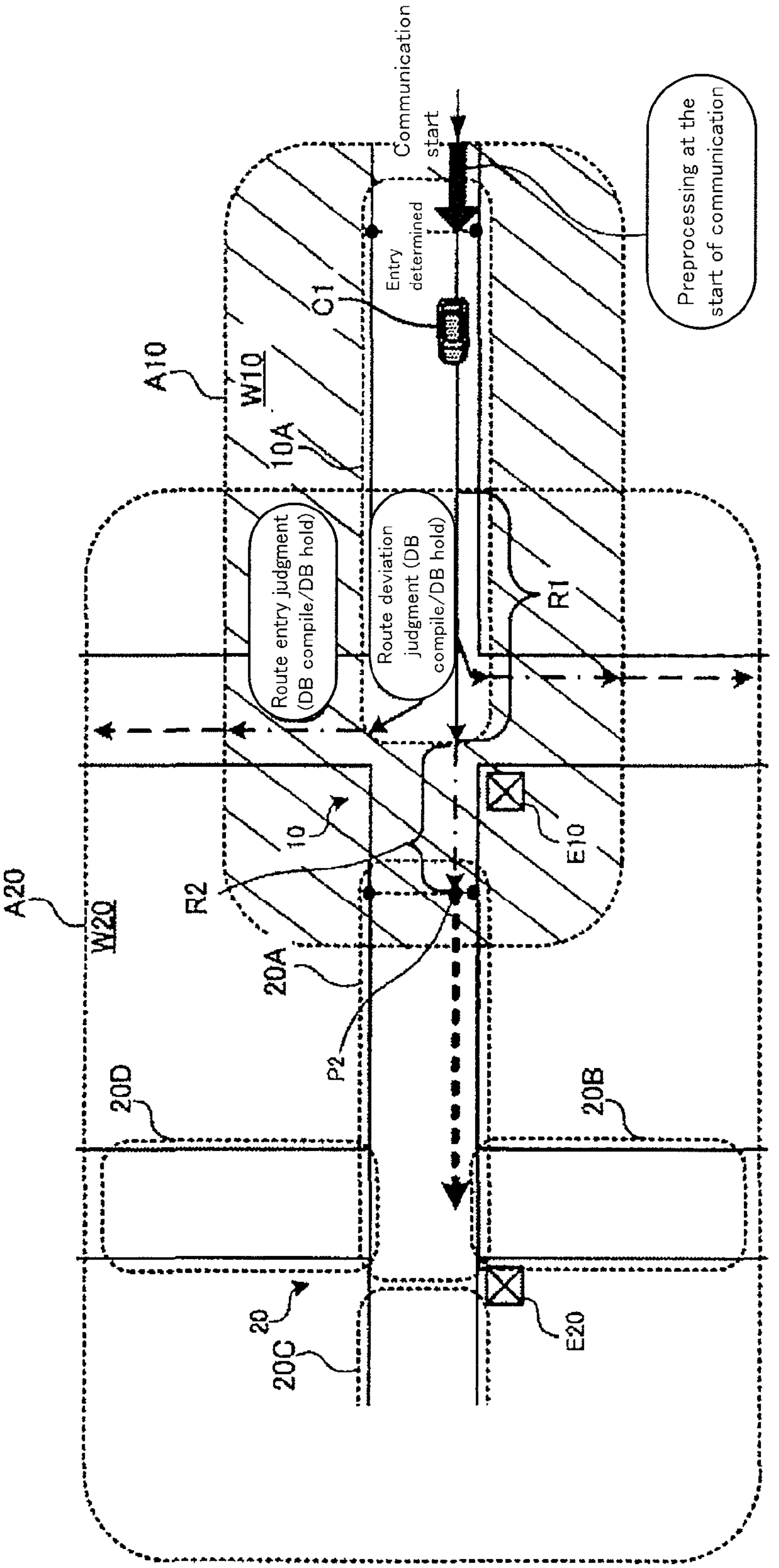
FIG. 22 is a schematic diagram showing a situation in which a self-vehicle with the information processing apparatus in the third embodiment installed drives on the service route while receiving the electric wave W10 and the electric wave E20 emitted from the two electric wave towers E10 and E20, respectively.

Next, with reference to FIG. 20 to FIG. 22, an explanation will be given on information processing on an in-vehicle information processing apparatus in a third embodiment. FIG. 20 is a flowchart showing a flow of the information processing on the in-vehicle information processing apparatus in the third embodiment. FIG. 21 is a schematic diagram showing the data logical structure of infrastructure data 600 held by an electric wave W20 emitted from an electric wave tower E20 provided at an object intersection 20 in the third embodiment. FIG. 22 is a schematic diagram showing a situation in which a self-vehicle with the information processing apparatus in the third embodiment installed drives on the service route while receiving the electric wave W10 and the electric wave E20 emitted from the two electric wave towers E10 and E20, respectively. Incidentally, in the third embodiment, substantially the same constituents as those in the first or second embodiment described above will carry substantially the same reference numerals, and the explanation thereof will be omitted as occasion demands. In addition, in the third embodiment, substantially the same processes as those in the first or second embodiment described above will carry substantially the same step numbers, and the explanation thereof will be omitted as occasion demands.

(Operation Principle of In-Vehicle Information Processing Apparatus)

Through the step S101 to the step S107 described above, the route deviation judgment part 124 of the ECU 100 judges whether or not the self-vehicle deviates from the determined special service route 10A described above (the step S108). Specifically, the route deviation judgment part 124 judges whether or not the self-vehicle deviates from the special service route 10A on the basis of the road linear data 520A stored in the route deviation judgment DB 123, i.e. the road linear data 520A corresponding to the determined special service route 10A, and the driving distance on the determined special service route 10A.

As a result of the judgment in the step S108 described above, if the route deviation judgment part 124 of the ECU 100 judges that the self-vehicle deviates from the determined special service route 10A described above (the step S108: Yes), under the control of the ECU 100, it is judged whether or not the information processing apparatus 1 can perform the communication through the electric wave W10 emitted from the electric wave tower E10 disposed at the object intersection 10 (step S301). Specifically, it is judged whether or not the information processing apparatus 1 can receive the electric wave W10 holding the infrastructure data 500 including the infrastructure identification number 511.

As a result of the judgment in the step S301, if it is judged that the information processing apparatus 1 can perform the communication through the electric wave W10 emitted from the electric wave tower E10 disposed at the object intersection 10 (the step S301: Yes), then, under the control of the ECU 100, it is further judged whether or not the information processing apparatus 1 is communicating with the electric wave tower E20 through the electric wave W20 emitted from the electric wave tower E20 disposed at the object intersection 20 (step S302). Specifically, under the control of the ECU 100, it is judged whether or not the information processing apparatus 1 has already started the communication through the electric wave W20 emitted from the electric wave tower E20 disposed at the object intersection 20 and is receiving the electric wave W20 holding infrastructure data 600 including an infrastructure identification number 611.

(Two Types of Data Structures)

Now, with reference to FIG. 21 and FIG. 22, an explanation will be given on the two types of infrastructure data respectively held by the two types of electric waves emitted from the two electric wave towers respectively disposed at the two object intersection.

As shown in FIG. 22, at each of the two object intersections 10 and 20, which are next to each other and which are the objects of the entry of the self-vehicle C1 in the third embodiment, a plurality of service routes intersect with one another.

In other words, at the object intersection 10, the four service routes 10A, 10B, 10C, and 10D intersect with one another. The object intersection 10 is provided with the electric wave tower E10, and the electric wave tower E10 emits the electric wave W10 holding the information about the various traffic service(s) on the four service routes 10A, 10B, 10C, and 10D. In other words, by means of the electric wave W10 emitted from the electric wave tower E10 disposed at the object intersection 10, the traffic service(s) on the four service routes 10A, 10B, 10C, and 10D is managed.

In substantially the same manner, at the object intersection 20, four service routes 20A, 20B, 20C, and 20D intersect with one another. The object intersection 20 is provided with the electric wave tower E20, and the electric wave tower E20 emits the electric wave W20 holding the information about the various traffic service(s) on the four service routes 20A, 20B, 20C, and 20D. In other words, by means of the electric wave W20 emitted from the electric wave tower E20 disposed at the object intersection 20, the traffic service(s) on the four service routes 20A, 20B, 20C, and 20D is managed.

The electric waves W10 and W20 hold identification information for identifying the electric wave towers from which the electric waves are respectively emitted. The self-vehicle receives the electric waves and obtains the identification information, whereby the two electric wave towers E10 and E20 can be identified, respectively.

In other words, the infrastructure data 500 held by the electric wave W10 emitted from the electric tower E10 disposed at the object intersection 10, as shown in FIG. 8 and FIG. 10(*a*) described above, includes (i) the system information 510 including the infrastructure identification number 511; (ii) the four road linear data 520A, 520B, 520C, and 520D corresponding to the four service routes 10A, 10B, 10C, and 10D, respectively; and (iii) the four service information 503A, 503B, 503C, and 503D respectively corresponding to the four service routes.

In substantially the same manner, the infrastructure data 600 held by the electric wave W20 emitted from the electric tower E20 disposed at the object intersection 20, as shown in FIG. 21, includes (i) system information 610 including the infrastructure identification number 611; (ii) four road linear data 620A, 620B, 620C, and 620D corresponding to the four service routes 20A, 20B, 20C, and 20D, respectively; and (iii) four service information 603A, 603B, 603C, and 603D respectively corresponding to the four service routes.

Incidentally, the information included in the infrastructure data 600 has different content from that of the information included in the infrastructure data 500 but has the same data structure. Thus, its detailed explanation will be omitted. Now, go back to FIG. 20 again.

(Operation Principle of In-Vehicle Information Processing Apparatus: Continued)

As a result of the judgment in the step S302 described above, if it is judged that the information processing apparatus 1 is communicating with the electric wave tower E20 through the electric wave W20 emitted from the electric wave tower E20 disposed at the object intersection 20, in other words, if the information processing apparatus 1 is receiving the two types of electric waves W10 and W20 after the determination of the deviation from the service route 10A managed by the electric wave W10 (the step S302: Yes), then, under the control of the ECU 100, the DB excluding the road linear data and including the service information is deleted (step S303). Typically, under the control of the ECU 100, the DB including the service information 503A is deleted. Incidentally, in the deletion, the DB including the road linear data 520A about the service route 10A managed by the electric wave W10 is held. This makes it possible to omit the information processing about the road linear data 520A, such as extracting the road linear data 520A again from the electric wave W10. Thus, it is possible to improve the efficiency of the information processing, thereby improving the speed of the information processing.

Specifically, as shown in FIG. 22, the information processing apparatus 1 is receiving the two types of electric waves W10 and W20 until the self-vehicle C1 passes through an entry determination point P2 at which the route entry to the service route 20A is determined while driving in a road area R2. And the entry to any service route is not determined after the self-vehicle C1 deviates from the special service route 10A. Thus, the DB obtained by compiling the infrastructure data 500 held by the electric wave W10 may be deleted.

(Database Compilation of Road Linear Data 520A to 520D and 620A to 620D)

After the step S303 described above, under the control of the ECU 100, the road linear data included in the infrastructure data is compiled into a database (the step S103). Typically, the road linear data 520A, 520B, 520C, and 520D included in the infrastructure data 500 held by the electric wave W10 and the road linear data 620A, 620B, 620C, and 620D included in the infrastructure data 600 held by the electric wave W20 are obtained through the communication between the information processing apparatus 1 and the electric wave towers E10 and E20 and are compiled into a database.

Then, the route entry judgment part 122 provided for the route entry/deviation judgment part 120 of the ECU 100 performs the route entry judging process of judging whether or not the self-vehicle enters any one of the service routes 10A, 10B, 10C, and 10D managed by the electric wave W10 and the service routes 20A, 20B, 20C, and 20D managed by the electric wave W20 (the step S104).

Specifically, as shown in FIG. 22, the information processing apparatus 1 is receiving the two types of electric waves W10 and W20 until the self-vehicle C1 passes through the entry determination point P2 at which the route entry to the service route 20A is determined while driving in the road area R2. After the self-vehicle C1 deviates from the special service route 10A, the entry to any service route is not determined. Thus, the route entry judging process of judging whether or not the self-vehicle enters any one of the service routes 10A, 10B, 10C, and 10D managed by the electric wave W10 and the service routes 20A, 20B, 20C, and 20D managed by the electric wave W20 is performed.

On the other hand, as a result of the judgment in the step S302 described above, if it is not judged that the information processing apparatus 1 is communicating with the electric wave tower E20 through the electric wave W20 emitted from the electric wave tower E20 disposed at the object intersection 20, in other words, if the information processing apparatus 1 is receiving only the electric wave W10 after the determination of the deviation from the service route 10A managed by the electric wave W10 (the step S302: No), then, under the control of the ECU 100, the DB including the road linear data 520A about the serviced route 10A and the service information 503A is held (step S304). Then, as described above, the route entry judgment part 122 of the ECU 100 performs the route entry judging process of judging whether or not the self-vehicle enters the special service route 10A (the step S104).

On the other hand, as a result of the judgment in the step S301 described above, if it is not judged that the information processing apparatus 1 can perform the communication through the electric wave W10 emitted from the electric wave tower E10 disposed at the object intersection 10, in other words, if it is judged that the information processing apparatus 1 cannot receive the electric wave W10 emitted from the electric wave tower E10 disposed at the object intersection 10 (the step S301: No), then, under the control of the ECU 100, the DB obtained by compiling the information obtained by the reception of the electric wave W10 is deleted (step S305). Then, under the control of the ECU 100, it is judged whether or not the communication between the information processing apparatus 1 and the road-side infrastructure is started (the step S102).

On the other hand, as a result of the judgment in the step S108 described above, if the route deviation judgment part 124 of the ECU 100 does not judge that the self-vehicle deviates from the determined special service route 10A described above, in other words, if it judges that the self-vehicle does not deviate from the determined special service route 10A described above (the step S108: No), the holding of the various DBs by the ECU 100 is continued (the step S112). Then, under the control of the ECU 100, the infrastructure data 500 corresponding to the determined special service route 10A is extracted, analyzed, and continuously compiled into a database (the step S106).

Specifically, as shown in FIG. 22, while the self-vehicle C1 is driving in a road area R1, the information processing apparatus 1 is receiving the electric wave W20 in addition to the electric wave W10; however, the preprocessing for the database compilation is not performed on the infrastructure data 600 held by the electric wave W20. In addition, since the self-vehicle C1 does not deviate from the service route 10A managed by the electric wave W10, the road linear data 520A, 520B, 520C, and 520D included in the infrastructure data 500 held by the electric wave W10 are obtained through the communication between the information processing apparatus 1 and the electric wave tower E10 and are compiled into a database.

Fourth Embodiment

Figure 23:
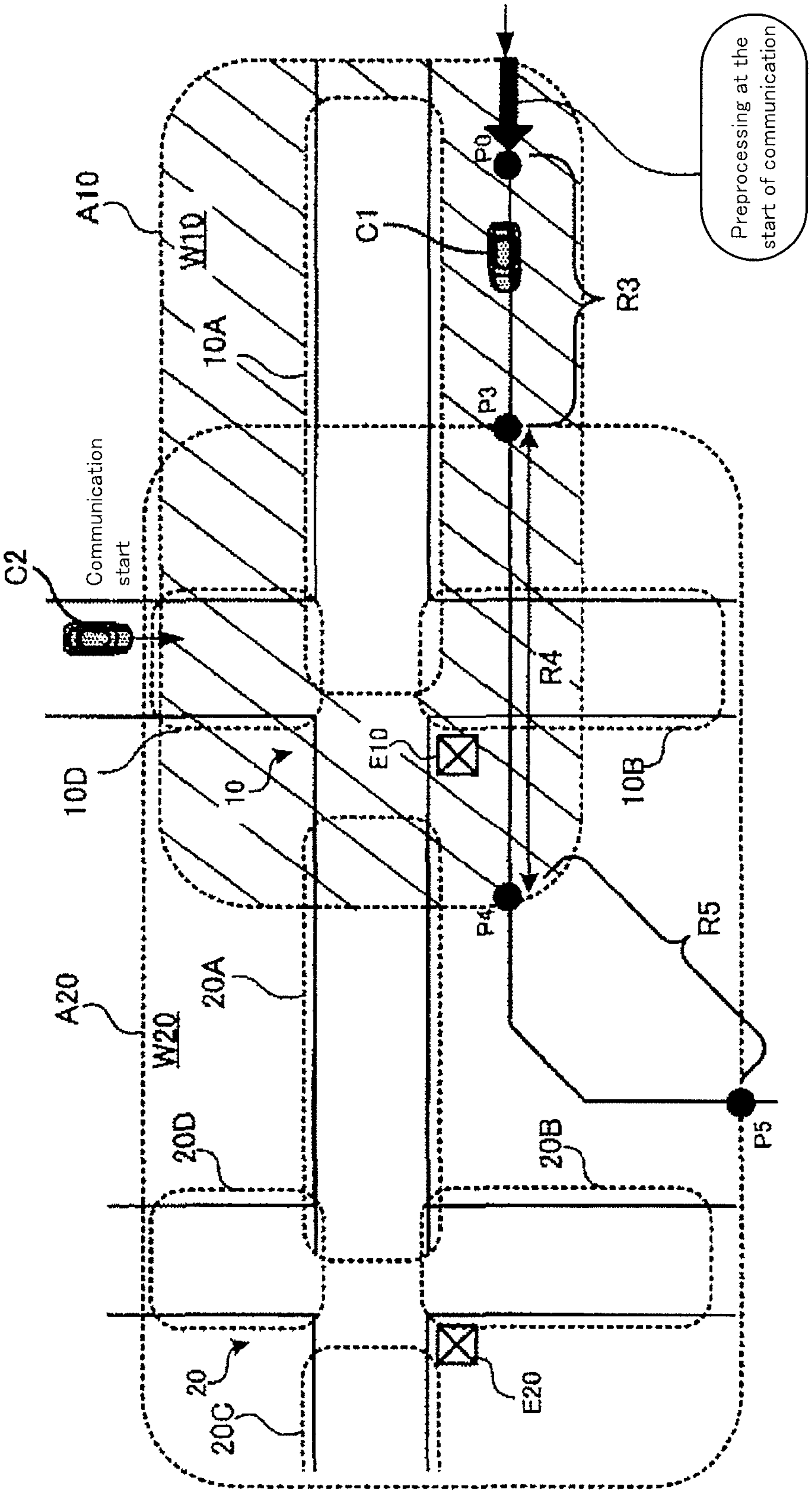
FIG. 23 is a schematic diagram showing a situation in which a self-vehicle with an information processing apparatus in a fourth embodiment installed drives in a state of being away from the service route while receiving the electric wave W10 and the electric wave E20 emitted from the two electric wave towers E10 and E20, respectively.

Next, with reference to FIG. 23, an explanation will be given on information processing on an in-vehicle information processing apparatus in a fourth embodiment. FIG. 23 is a schematic diagram showing a situation in which a self-vehicle with the information processing apparatus in the fourth embodiment installed drives in a state of being away from the service route while receiving the electric wave W10 and the electric wave E20 emitted from the two electric wave towers E10 and E20, respectively. Incidentally, in the fourth embodiment, substantially the same constituents as those in the first, second, or third embodiment described above will carry substantially the same reference numerals, and the explanation thereof will be omitted as occasion demands.

As shown in FIG. 23, after the start of the communication between the self-vehicle C1 and the electric wave tower E10, the information processing apparatus 1 is receiving the electric waves W10. Thus, the preprocessing for the database compilation is performed on the infrastructure data held by the electric wave W10.

Then, while the self-vehicle C1 is driving in a road area R3, i.e. from a point PO to a point P3, the information processing apparatus 1 is receiving the electric waves W10. Thus, the route entry judging process of judging whether or not the self-vehicle enters any one of the service routes 10A, 10B, 10C, and 10D managed by the electric wave W10 is performed.

Then, while the self-vehicle C1 is driving in a road area R4, i.e. from the point P3 to a point P4, the information processing apparatus 1 is receiving the electric wave W20 in addition to the electric waves W10 and the entry to any service route is not determined. Thus, the route entry judging process of judging whether or not the self-vehicle enters any one of the service routes 10A, 10B, 10C, and 10D managed by the electric wave W10 and the service routes 20A, 20B, 20C, and 20D managed by the electric wave W20 is performed. In particular, while the self-vehicle C1 is driving in the road area R4, the process of judging about the entry to the service routes 10A, 10B, 10C, and 10D managed by the electric wave W10 is already performed. Thus, the DB obtained by compiling the road linear data 520A, 520B, 520C, and 520D included in the infrastructure data 500 held by the electric wave W10 is preferably held. This makes it possible to omit the information processing about the road linear data 520A, such as extracting the road linear data 520A again from the electric wave W10. Thus, it is possible to improve the efficiency of the information processing, thereby improving the speed of the information processing.

Then, while the self-vehicle C1 is driving in a road area R5, i.e. from the point P4 to a point P5, the information processing apparatus 1 cannot receive the electric waves W10 and the self-vehicle C1 is away from the service route managed by the electric wave W10. At the same time, the information processing apparatus 1 is receiving the electric waves W20 and the entry to any service route is not determined. Thus, the route entry judging process of judging whether or not the self-vehicle enters any one of the service routes 20A, 20B, 20C, and 20D managed by the electric wave W20 is performed. Particularly, at this time, the DB obtained by compiling the infrastructure data 500 held by the electric wave W10 may be deleted.

(Self-Vehicle C2)

In substantially the same manner, as shown in FIG. 23, a self-vehicle C2 simultaneously starts the communications with the electric towers E10 and E20 and the information processing apparatus 1 of the self-vehicle C2 is receiving the two types of electric waves W10 and W20. Thus, the road linear data 520A, 520B, 520C, and 520D included in the infrastructure data 500 held by the electric wave W10 and the road linear data 620A, 620B, 620C, and 620D included in the infrastructure data 600 held by the electric wave W20 are obtained through the communication between the information processing apparatus 1 and the electric wave towers E10 and E20 and compiled into a database.

Then, the route entry judging process of judging whether or not the self-vehicle enters any one of the service routes 10A, 10B, 10C, and 10D managed by the electric wave W10 and the service routes 20A, 20B, 20C, and 20D managed by the electric wave W20 is performed.

Then, after the determination of the route entry to the service route 10D, in order to provide the traffic services on the service route 10D, the road linear data 520D about the service route 10D and the service information 503D are compiled into a database.

Fifth Embodiment

Figure 24:
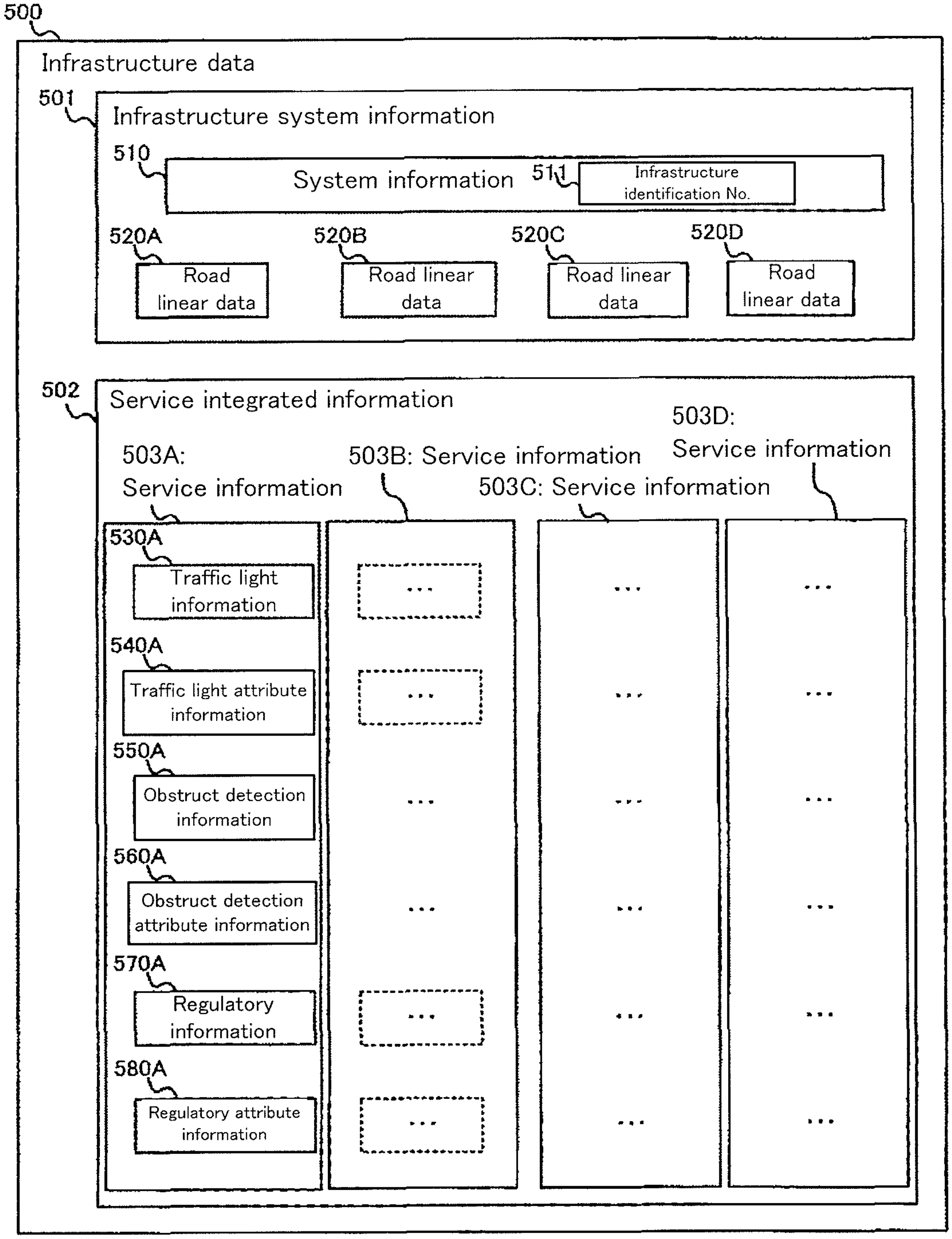
FIG. 24 is a schematic diagram showing the data logical structure of infrastructure data 500 in a fifth embodiment.
Figure 25:
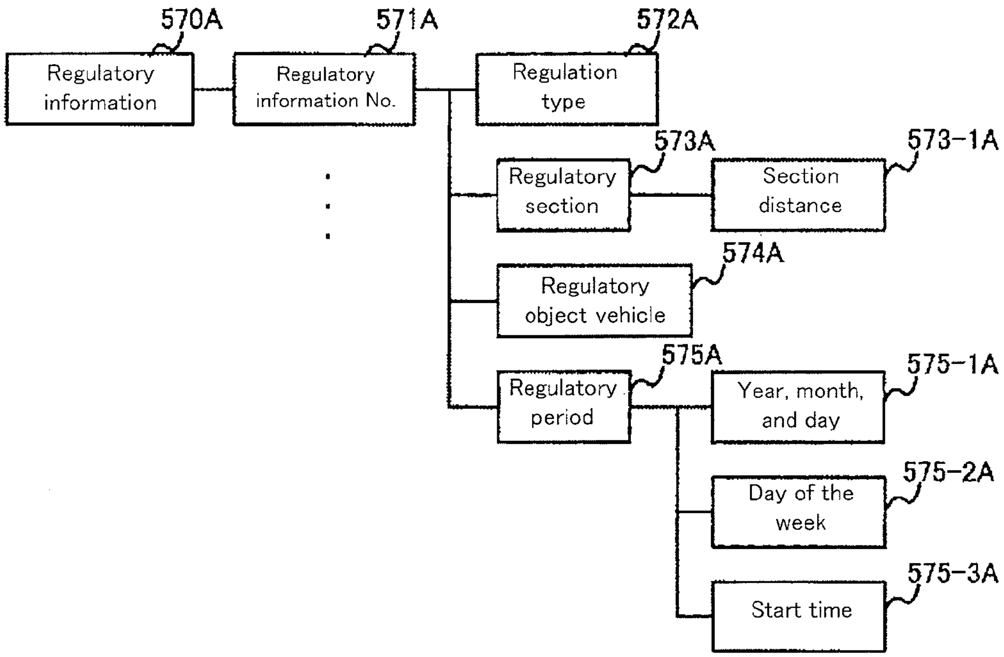
FIG. 25 is a schematic diagram showing the data logical hierarchy of regulatory information 570A included in service information 503A in the fifth embodiment.
Figure 26:
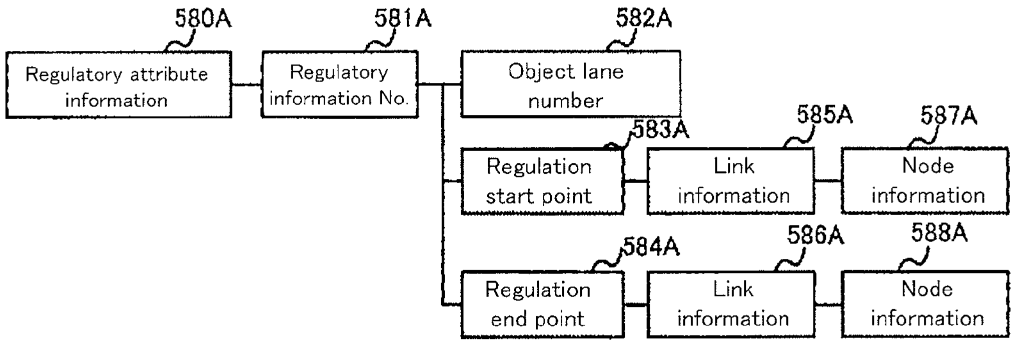
FIG. 26 is a schematic diagram showing the data logical hierarchy of regulatory attribute information 580A included in the service information 503A in the fifth embodiment.

Next, with reference to FIG. 24 to FIG. 26, an explanation will be given on information processing on an in-vehicle information processing apparatus in a fifth embodiment. FIG. 24 is a schematic diagram showing the data logical structure of the infrastructure data 500 in the fifth embodiment. FIG. 25 is a schematic diagram showing the data logical hierarchy of regulatory information 570A included in the service information 503A in the fifth embodiment. FIG. 26 is a schematic diagram showing the data logical hierarchy of regulatory attribute information 580A included in the service information 503A in the fifth embodiment. Incidentally, in the fourth embodiment, substantially the same constituents as those in the first, second, or third embodiment described above will carry substantially the same reference numerals, and the explanation thereof will be omitted as occasion demands.

As shown in FIG. 24, the service information 503A described above includes the traffic light information 530A, the traffic light attribute information 540A, the obstacle detection information 550A, the obstacle detection attribute information 560A, regulatory information 570A, and regulatory attribute information 580A. The regulatory information 570A is information about the content of traffic regulation such as, for example, a stop and one-way traffic and information about an applicable period for the traffic regulation. The regulatory attribute information 580A is information about a regulatory position and the location and length of a regulatory section.

(Regulatory Information)

As shown in FIG. 25, the regulatory information 570A is provided with a regulatory information number 571A as the first hierarchy. As the second hierarchy, it is provided with a regulation type 572A, a regulatory section 573A, a regulatory object vehicle 574A, and a regulatory period 575A. As the third hierarchy, it is provided with: a section distance 573-1A corresponding to the regulatory section 573A; and a date (year, month, and day) 575-1A, a day of the week 575-2A, and a start time 575-3A, which correspond to the regulatory period 575A.

As shown in FIG. 26, the regulatory attribute information 580A is provided with a regulatory information number 571A as the first hierarchy. As the second hierarchy, it is provided with an object lane number 582A, a regulation start point 583A, and a regulation end point 584A. As the third hierarchy, it is provided with link information 585A corresponding to the regulation start point 583A and link information 586A corresponding to the regulation end point 584A. As the fourth hierarchy, it is provided with node information 587A corresponding to the regulation start point 583A and node information 588A corresponding to the regulation end point 584A.

Incidentally, the information may be used for a service for preventing the overlooking of stop regulation and the like, as a service using the regulatory information.

The present invention is not limited to the aforementioned embodiments, but various changes may be made, if desired, without departing from the essence or spirit of the invention which can be read from the claims and the entire specification. A vehicular control apparatus, which involves such changes, is also intended to be within the technical scope of the present invention.

INDUSTRIAL APPLICABILITY

The present invention can be applied, for example, to a vehicular control apparatus for performing driving assistance for a vehicle.

DESCRIPTION OF REFERENCE CODES 1 information processing apparatus
2 measurement part
3 obtaining part (e.g. road-to-vehicle communication device)
4 driving assistance part
5 informing apparatus
10 object intersection
10A service route
10B service route
10C service route
10D service route
20 object intersection
20A service route
20B service route
20C service route

20D service route
100 ECU
110 preprocessing part
111 format analysis part
112 main database (hereinafter "main DB 112" as occasion demands)
113 route information analysis part
114 object intersection information analysis part
120 route entry/deviation judgment part
121 route entry judgment DB
122 route entry judgment part
123 route deviation judgment DB
124 route deviation judgment part
125 driving distance estimation part
130 communication judgment part
140 weighting part
151 object intersection DB
152 service route DB
500 infrastructure data
501 infrastructure system information
502 service integrated information
510 system information
511 infrastructure identification number
520A, 520B, 520C, 520D road linear data
502 service integrated information
503A, 503B, 503C, 503D service information
600 infrastructure data
601 infrastructure system information
602 service integrated information
601 infrastructure system information
610 system information
611 infrastructure identification number
620A, 620B, 620C, 620D road linear data
602 service integrated information
603A, 603B, 603C, 603D service information
E10 electric wave tower
W10 electric wave
N10 road-side infrastructure apparatus
M10 road-side apparatus
DS10 vehicle detection sensor
E20 electric wave tower
W20 electric wave

The invention claimed is:

1. A vehicular control apparatus comprising:

an obtaining device configured to receive an electric wave from an electric wave communication base which emits the electric wave for providing driving assistance service to a plurality of vehicles which respectively drive on a plurality of service roads, and to obtain a plurality of road data respectively corresponding to the plurality of service roads managed by the electric wave communication base; and a weighting device for assigning, to each of the obtained plurality of road data, first and second weighting information, wherein, (i-1) the first weighting information indicates preferential order of importance of the obtained plurality of road data for specifying first preferential road data, (i-2) the second weighting information indicates preferential order of importance of the obtained plurality of road data for specifying second preferential road data, (ii-1) the first preferential road data is one portion of the obtained plurality of road data to which first information processing is preferentially performed, (ii-2) the second preferential road data is one portion of the obtained plurality of road data to which second information processing is preferentially performed, (iii-1) the first information processing specifies one service road that one vehicle enters, and (iii-2) the second information processing provides the driving assistance service to the one vehicle which enters the one service road.

2. The vehicular control apparatus according to claim 1, further comprising a first specifying device for specifying one service road that one vehicle enters.

3. The vehicular control apparatus according to claim 1, comprising a deleting device for deleting one portion of the obtained plurality of road data on the basis of the assigned first and second weighting information.

4. A vehicular control apparatus comprising:

an obtaining device configured to receive an electric wave from an electric wave communication base which emits the electric wave for providing driving assistance service to a plurality of vehicles which respectively drive on a plurality of service roads, and to obtain a plurality of road data respectively corresponding to the plurality of service roads managed by the electric wave communication base;

a memory device for storing the obtained plurality of road data; and a weighting device for assigning, to each of the stored plurality of road data, first and second weighting information, wherein (i-1) the first weighting information indicates preferential order of importance of the obtained plurality of road data for specifying first preferential road data, (i-2) the second weighting information indicates preferential order of importance of the obtained plurality of road data for specifying second preferential road data, (ii-1) the first preferential road data is one portion of the obtained plurality of road data to which first information processing is preferentially performed, (ii-2) the second preferential road data is one portion of the obtained plurality of road data to which second information processing is preferentially performed, (iii-1) the first information processing specifies one service road that one vehicle enters, and (iii-2) the second information processing provides the driving assistance service to the one vehicle which enters the one service road.

5. The vehicular control apparatus according to claim 4, further comprising a memory controlling device for controlling the memory device to delete one portion of the stored plurality of road data on the basis of the assigned first and second weighting information.

6. The vehicular control apparatus according to claim 1, wherein the obtaining device obtains a plurality of road linear data about road shapes of the plurality of service roads as the plurality of road data, and the vehicular control apparatus further comprises a second specifying device for specifying one service road that one vehicle enters, on the basis of the obtained plurality of road linear data.

7. The vehicular control apparatus according to claim 1, further comprising:

a first specifying device capable of specifying one service road that one vehicle enters;

a first judging device for judging whether or not the one vehicle deviates from the specified one service road;

a second judging device for judging whether or not the electric wave can be received;

a memory device for storing the obtained plurality of road data; and a first controlling device for controlling the memory device (i) to hold the stored plurality of road data if it is judged that the one vehicle deviates from the specified one service road and if it is judged that the electric wave can be received and (ii) to delete the stored plurality of road data if it is judged that the one vehicle deviates from the specified one service road and if it is judged that the electric wave cannot be received.

8. A vehicular control apparatus comprising:

an obtaining device configured to receive a first electric wave from a first communication base which emits the first electric wave for providing driving assistance service to a plurality of vehicles which respectively drive on a plurality of first service roads, and to obtain a plurality of first road data respectively corresponding to the plurality of first service roads managed by the first communication base and capable of receiving a second electric wave from a second communication base which is different from the first communication base, and of obtaining a plurality of second road data respectively corresponding to a plurality of second service roads managed by the second communication base; and a weighting device for assigning, to each of the obtained plurality of first road data and the obtained plurality of second road data, first and second weighting information, wherein (i-1) the first weighting information indicates preferential order of importance of the obtained plurality of first and second road data for specifying first preferential road data, (i-2) the second weighting information indicates preferential order of importance of the obtained plurality of first and second road data for specifying second preferential road data, (ii-1) the first preferential road data is one portion of the obtained plurality of first and second road data to which first information processing is preferentially performed, (ii-2) the second preferential road data is one portion of the obtained plurality of first and second road data to which second information processing is preferentially performed, (iii-1) the first information processing specifies one first service road or one second service road that one vehicle enters, and (iii-2) the second information processing provides the driving assistance service to the one vehicle which enters the one first service road or the one second service road.

9. The vehicular control apparatus according to claim 8, further comprising a deleting device for deleting one portion of the obtained plurality of first road data and the obtained plurality of second road data on the basis of the assigned first and second weighting information.

10. The vehicular control apparatus according to claim 8, further comprising a third specifying device for specifying one first service road or one second service road that one vehicle enters.

11. The vehicular control apparatus according to claim 10, further comprising:

a memory device for storing the obtained plurality of first road data and the obtained plurality of second road data; and a second controlling device for controlling the memory device to delete one portion of the stored plurality of first road data and the stored plurality of second road data on the basis of (i) whether or not one first service road or one second service road that one vehicle enters is specified, (ii) condition of reception of the first electric wave, (iii) condition of reception of the second electric wave, or (iv) whether or not the one vehicle deviates from the specified one first service road or the specified one second service road.

12. The vehicular control apparatus according to claim 11, wherein the second controlling device controls the third specifying device to specify one first service road or one second service road that one vehicle enters, on the basis of the obtained plurality of first road data and the obtained plurality of second road data if the second electric wave is received after the one first service road that the one vehicle enters is specified and if the one vehicle deviates from the specified one service road after the second electric wave is received.

13. The vehicular control apparatus according to claim 11, wherein the second controlling device controls the memory device to delete the stored plurality of first road data if the one vehicle deviates from the specified one first service road.

14. The vehicular control apparatus according to claim 11, wherein the second controlling device controls the memory device to delete the stored plurality of first road data and to hold the stored plurality of second road data if the condition of reception changes from a reception condition in which the first electric wave and the second electric wave can be received to a reception condition in which only the second electric wave can be received without specifying the service road that the one vehicle enters.

15. The vehicular control apparatus according to claim 4, wherein the obtaining device obtains a plurality of road linear data about road shapes of the plurality of service roads as the plurality of road data, and the vehicular control apparatus further comprises a second specifying device for specifying one service road that one vehicle enters, on the basis of the obtained plurality of road linear data.

16. The vehicular control apparatus according to claim 4, further comprising:

a first specifying device capable of specifying one service road that one vehicle enters;

a first judging device for judging whether or not the one vehicle deviates from the specified one service road;

a second judging device for judging whether or not the electric wave can be received;

a memory device for storing the obtained plurality of road data; and a first controlling device for controlling the memory device (i) to hold the stored plurality of road data if it is judged that the one vehicle deviates from the specified one service road and if it is judged that the electric wave can be received and (ii) to delete the stored plurality of road data if it is judged that the one vehicle deviates from the specified one service road and if it is judged that the electric wave cannot be received.

* * * * *